US012802394B2

(12) United States Patent
Xu et al.

(10) Patent No.: US 12,802,394 B2
(45) Date of Patent: Nov. 17, 2026

(54) SYSTEM AND A METHOD FOR DETECTING COMPUTER-GENERATED IMAGES

(71) Applicant: Centre for Intelligent Multidimensional Data Analysis Limited, Pak Shek Kok (HK)

(72) Inventors: Qiang Xu, Pak Shek Kok (HK); Hong Yan, Pak Shek Kok (HK)

(73) Assignee: Centre for Intelligent Multidimensional Data Analysis Limited, Pak Shek Kok (HK)

( * ) Notice: Subject to any disclaimer, the term of this patent is extended or adjusted under 35 U.S.C. 154(b) by 388 days.

(21) Appl. No.: 18/456,595

(22) Filed: Aug. 28, 2023

(65) Prior Publication Data

US 2025/0078446 A1 Mar. 6, 2025

(51) Int. Cl.

| | |
|---|---|
| ***G06V 10/56*** | (2022.01) |
| ***G06T 7/12*** | (2017.01) |
| ***G06T 7/40*** | (2017.01) |
| ***G06V 10/42*** | (2022.01) |
| ***G06V 10/771*** | (2022.01) |

(52) U.S. Cl.

CPC ................ *G06V 10/56* (2022.01); *G06T 7/12* (2017.01); *G06T 7/40* (2013.01); *G06V 10/42* (2022.01); *G06V 10/771* (2022.01); *G06T 2207/20084* (2013.01)

(58) Field of Classification Search

CPC ..................... G06T 7/40; G06T 7/0002; G06T 2207/10004; G06T 2207/30168; G06T 2207/20084; G06V 10/42; G06V 10/26; G06V 10/82; G06N 3/0464

See application file for complete search history.

(56) References Cited

FOREIGN PATENT DOCUMENTS

CN 115311475 A 11/2022

OTHER PUBLICATIONS

X. Wang, K. Yu, C. Dong and C. Change Loy, "Recovering Realistic Texture in Image Super-Resolution by Deep Spatial Feature Transform," 2018 IEEE/CVF Conference on Computer Vision and Pattern Recognition, Salt Lake City, UT, USA, 2018, pp. 606-615, doi: 10.1109/CVPR.2018.00070. (Year: 2018).*

Woo, S., Park, J., Lee, J.-Y., & Kweon, I. S. (2018). Cbam: Convolutional block attention module. In Proceedings of the European conference on computer vision (pp. 3â19). (Year: 2018).*

J. Yang, A. Li, S. Xiao, W. Lu and X. Gao, "MTD-Net: Learning to Detect Deepfakes Images by Multi-Scale Texture Difference," in IEEE Transactions on Information Forensics and Security, vol. 16, pp. 4234-4245, 2021, doi: 10.1109/TIFS.2021.3102487. (Year: 2021).*

(Continued)

*Primary Examiner* — Chan S Park

*Assistant Examiner* — Chandhana Pedapati

(74) *Attorney, Agent, or Firm* — Renner, Kenner, Greive, Bobak, Taylor & Weber

(57) ABSTRACT

A system and a method for detecting computer-generated images. The system includes an image processing engine arranged to analyze an input digital image embedded with image traces created during generation and/or post-generation processing operation of the input digital image, and to determine whether the input digital image is a computer-generated image or a natural photographic image based on the analysis of the image traces.

15 Claims, 15 Drawing Sheets

(56) References Cited

OTHER PUBLICATIONS

Zhao, L., Zhang, M., Ding, H., & Cui, X. (2021). MFF-Net: Deepfake Detection Network Based on Multi-Feature Fusion. Entropy, 23(12), 1692. https://doi.org/10.3390/e23121692. (Year: 2021).*

Qiang Xu and Shan Jia and Xinghao Jiang and Tanfeng Sun and Zhe Wang and Hong Yan. "Joint Learning of Deep Texture and High-Frequency Features for Computer-Generated Image Detection". arXiv, 2022, arXiv: 2209.03322. (Year: 2022).*

Peng, F., Li, J.-t. and Long, M. (2015), Identification of Natural Images and Computer-Generated Graphics Based on Statistical and Textural Features . J Forensic Sci, 60: 435-443. https://doi.org/10.1111/1556-4029.12680 (Year: 2014).*

X. Ni, L. Chen, L. Yuan, G. Wu and Y. Yao, "An Evaluation of Deep Learning-Based Computer Generated Image Detection Approaches," in IEEE Access, vol. 7, pp. 130830-130840, 2019, doi: 10.1109/ACCESS.2019.2940383. (Year: 2019).*

R.S Zhang, W.Z Quan, L.B. Fan, et al., "Distinguishing Computer-Generated Images from Natural Images Using Channel and Pixel Correlation," Journal of Computer Science and Technology 35, 3 (2020), 592-602.

Y. Yao, Z Zhang, X Ni, et al., "CGNet: Detecting computer-generated images based on transfer learning with attention module," Signal Processing: Image Communication 105 (2022), 116692.

M P Gangan, K Anoop, V.L Lajish, "Distinguishing natural and computer generated images using Multi-Colorspace fused EfcientNet," Journal of Information Security and Applications 68 (2022), 103261.

Z Liu, X Qi, P Torr., "Global Texture enhancement for fake face detection in the wild," In Proceedings of the IEEE/CVF conference on computer vision and pattern recognition. 8060-8069.

* cited by examiner

SYSTEM AND A METHOD FOR DETECTING COMPUTER-GENERATED IMAGES

TECHNICAL FIELD

The invention relates to a system and a method for detecting computer-generated images, and particularly, although not exclusively, to a system for identifying computer-generated images and naturally generated photographic images.

BACKGROUND

The advancement of digital imaging, media editing technologies and artificial intelligence (AI) generative models (e.g., generative adversarial network (GAN), diffusion models (DM)) have made it increasingly easier to synthesize compelling computer-generated (CG) images. Although CG images have broadened the boundaries of digital multimedia, they have also aroused wide concerns about the authenticity of digital media due to the fact that fake CG images may lead to misinformation and pose a serious threat to the information ecosystem. One recent example is that an award-winning documentary photographer fooled the world with computer-generated images, showing that the photojournalism industry is quite vulnerable to fake news pictures.

Distinguishing between computer-generated and natural photographic (PG) images is of great importance to verify the authenticity and originality of digital images. However, these aforesaid cutting-edge generation methods enable high qualities of synthesis in CG images, which makes this challenging task even trickier and more challenging.

SUMMARY OF THE INVENTION

In accordance with a first aspect of the present invention, there is provided a system for detecting computer-generated images, comprising an image processing engine arranged to analyze an input digital image embedded with image traces created during generation and/or post-generation processing operation of the input digital image, and to determine whether the input digital image is a computer-generated image or a natural photographic image based on the analysis of the image traces.

In accordance with the first aspect, the image traces includes multi-scale texture patterns of image features in the input digital image.

In accordance with the first aspect, the image processing engine includes a machine-learning based processing engine.

In accordance with the first aspect, the image processing engine comprises a global texture representation module arranged to capture relationship and differences of the multi-scale texture patterns so as a determine whether the image features are generated by a computing process or by a photographical means.

In accordance with the first aspect, the global texture representation module incorporates ResNet architecture.

In accordance with the first aspect, the global texture representation module comprises at least one convolution layer, a Gram matrix-based activation layer and a global pooling layer.

In accordance with the first aspect, the image processing engine further comprises a texture enhancement module arrange to amplify texture differences of the multi-scale texture patterns.

In accordance with the first aspect, the texture enhancement module is arranged to amplify discriminative traces associated with the image features thereby to facilitate capturing of relationship and differences of the multi-scale texture pattern by the global texture representation module.

In accordance with the first aspect, the discriminative traces are amplified based on a semantic segmentation map guided affine transformation operation and convolutional neural networks-based texture recovery.

In accordance with the first aspect, the texture enhancement module comprises at least one convolution layer, semantic segmentation map-guide residual blocks, an affine transformation module and an upsampling module.

In accordance with the first aspect, the image processing engine further comprises a deep parsing network arranged to generate a segmentation map for the semantic segmentation map guided affine transformation operation.

In accordance with the first aspect, the deep parsing network is further arranged to generate intermediate spatial feature transformation maps and feature maps associated with the image features for further process by the affine transformation module.

In accordance with the first aspect, the image processing engine further comprises an attention-based feature perception module arranged to facilitate trace exploration in spatial and channel dimensions.

In accordance with the first aspect, the attention-based feature perception module comprises a convolution layer, an average-pooling layer and a channel-spatial attention module.

In accordance with the first aspect, the channel-spatial attention module comprises a channel attention submodule connected to a spatial attention submodule in a sequential order.

In accordance with the first aspect, the image processing engine further comprises a fully connected layer and a softmax layer arranged to determine an output probability of whether the input digital image is a computer-generated image or a natural photographic image based on concatenated high-level features obtained by the global texture representation module, the texture enhancement module and the attention-based feature perception module.

In accordance with the first aspect, the image traces includes texture perturbation, high-frequency residual or global spatial trace in the input digital image.

In accordance with the first aspect, the computer-generated image is generated by geometric data modeling, photorealistic rendering or is generated based on an artificial intelligence generative model.

In accordance with the first aspect, the image processing engine is trained by providing both a plurality of computer-generated images and a plurality of natural photographic image as positive samples and negative samples so as to train the image processing engine in a machine learning process, wherein the natural photographic images are generated by a digital camera.

In accordance with the first aspect, the negative samples and the positive samples includes, respectively, natural photographic images and computer-generated images added with image noise and/or compression traces.

In accordance with a second aspect of the present invention, there is provided a method for detecting computer-generated images, comprising the steps of analyzing an input digital image embedded with image traces created during generation and/or post-generation processing operation of the input digital image, and determining whether the input digital image is a computer-generated image or a natural photographic image based on the analysis of the image traces.

In accordance with the second aspect, the image traces includes multi-scale texture patterns of image features in the input digital image.

In accordance with the second aspect, the method is performed by an image processing engine including a machine-learning based processing engine.

In accordance with the second aspect, the image processing engine comprises a global texture representation module arranged to capture relationship and differences of the multi-scale texture patterns so as a determine whether the image features are generated by a computing process or by a photographical means.

In accordance with the second aspect, the global texture representation module incorporates ResNet architecture.

In accordance with the second aspect, the global texture representation module comprises at least one convolution layer, a Gram matrix-based activation layer and a global pooling layer.

In accordance with the second aspect, the image processing engine further comprises a texture enhancement module arrange to amplify texture differences of the multi-scale texture patterns.

In accordance with the second aspect, the texture enhancement module is arranged to amplify discriminative traces associated with the image features thereby to facilitate capturing of relationship and differences of the multi-scale texture pattern by the global texture representation module.

In accordance with the second aspect, the discriminative traces are amplified based on a semantic segmentation map guided affine transformation operation and convolutional neural networks-based texture recovery.

In accordance with the second aspect, the texture enhancement module comprises at least one convolution layer, semantic segmentation map-guide residual blocks, an affine transformation module and an upsampling module.

In accordance with the second aspect, the image processing engine further comprises a deep parsing network arranged to generate a segmentation map for the semantic segmentation map guided affine transformation operation.

In accordance with the second aspect, the deep parsing network is further arranged to generate intermediate spatial feature transformation maps and feature maps associated with the image features for further process by the affine transformation module.

In accordance with the second aspect, the image processing engine further comprises an attention-based feature perception module arranged to facilitate trace exploration in spatial and channel dimensions.

In accordance with the second aspect, the attention-based feature perception module comprises a convolution layer, an average-pooling layer and a channel-spatial attention module.

In accordance with the second aspect, the channel-spatial attention module comprises a channel attention submodule connected to a spatial attention submodule in a sequential order.

In accordance with the second aspect, the image processing engine further comprises a fully connected layer and a softmax layer arranged to determine an output probability of whether the input digital image is a computer-generated image or a natural photographic image based on concatenated high-level features obtained by the global texture representation module, the texture enhancement module and the attention-based feature perception module.

In accordance with the second aspect, the image traces includes texture perturbation, high-frequency residual or global spatial trace in the input digital image.

In accordance with the second aspect, the computer-generated image is generated by geometric data modeling, photorealistic rendering or is generated based on an artificial intelligence generative model.

In accordance with the second aspect, the image processing engine is trained by providing both a plurality of computer-generated images and a plurality of natural photographic image as positive samples and negative samples so as to train the image processing engine in a machine learning process, wherein the natural photographic images are generated by a digital camera.

In accordance with the second aspect, the negative samples and the positive samples includes, respectively, natural photographic images and computer-generated images added with image noise and/or compression traces.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Without wishing the be bound by theory, the inventors, through their experiments, trials and research, devised that Computer Generated (CG) images may be divided into two categories, namely traditional CG (TCG), and AI generated (AIG) images. The generation of TCG images may rely on geometric data modeling and photorealistic rendering, while that of AIG images may be based on artificial intelligence technologies such as GAN, autoregressive models, flows, and DM.

Some methods for detection of CG image may focus on active forensics techniques, such as digital watermarking, where a watermark is embedded into the image before its delivery. The authenticity can be verified by comparing the extracted code with the original inserted code. However, these techniques require a specific code to be embedded when the picture is taken and face the challenge of how to balance invisibility and robustness.

Alternatively, it may be possible to pay attention to passive (blind) forensics for fake image detection, which only relies on the intrinsic traces left in the digital media due to the image generation procedure. In one example detection method, the process may involve exploring hand-crafted features or statistical analysis to represent the distinct intrinsic traces in CG and PG images, such as local binary pattern (LBP), color, texture, and shape features. However, the traditional features can hardly deal with complex images with heterogeneous origins.

Deep-learning may be employed to improve performance in various vision applications as well as the CG image detection, however, deep-learning derived methods may also overfit when not trained with sufficiently representative data. Furthermore, most deep features are automatically learned from the original images. How the distinct intrinsic traces are generated and how they can be effectively represented are ignored in the field of CG image detection due to the lack of deep exploration of the image acquisition process.

Figure 1:
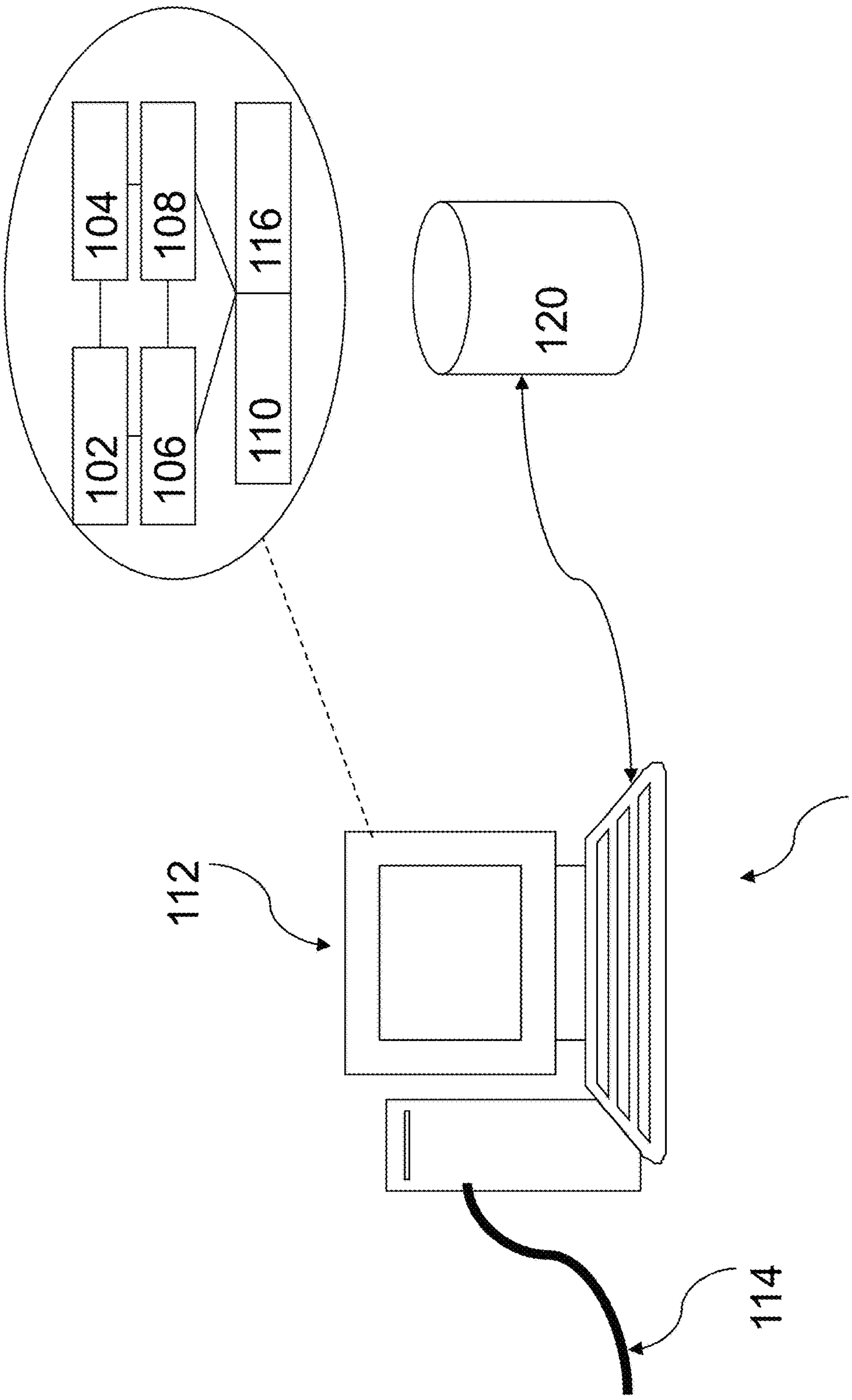
FIG. 1 is a schematic diagram of a computer server which is arranged to be implemented as a system for detecting computer-generated images in accordance with an embodiment of the present invention.

Referring to FIG. 1, an embodiment of the present invention is illustrated. This embodiment is arranged to provide a system for detecting computer-generated images, comprising an image processing engine arranged to analyze an input digital image embedded with image traces created during generation and/or post-generation processing operation of the input digital image, and to determine whether the input digital image is a computer-generated image or a natural photographic image based on the analysis of the image traces.

In this example embodiment, the image processing engine is implemented by a computer having an appropriate user interface. The computer may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device may be appropriately programmed to implement the invention.

The system may be used to receive a digital image, such as a JPEG file with multiple image features presented on the image, such as various objects and scenery under different illumination conditions. These features may either be created by recording light using suitable image capturing equipment such as a digital camera or as computer renderings. The image processing engine may analyze all image features as well as all intrinsic traces associated with the image features to determine whether the input digital image is a computer-generated image or a natural photographic image. For example, an "ideal" image which does not include traces that should appear on a natural photographic image, such as noise that can't be avoided due to operations of an image sensor in a digital camera or image distortions causes by imperfect focusing of camera lenses. With such a system for detecting computer-generated images, CG images or "faked" images may be detected, which may be useful for identifying fake information to prevent fraud.

The inventors devised that four major shortcomings still exist for practical applications:

1) The inherent different generation mechanisms between CG and PG images are not described or fully considered in some example methods.
2) The lack of comprehensive consideration for TCG and AIG images presents a distinct deficiency for some example methods.
3) Some methods straightforwardly apply a data-driven approach for detection, no potential module is designed to drive the models to focus on discriminative traces.
4) Increasingly realistic CG images have made detection more difficult while there is a lack of large-scale and highly-diverse datasets containing different types of heterogeneous CG images for the evaluation of detection methods.

To remedy the shortcomings, the differences in the acquisition between PG and CG images are considered. Instead of directly learning features from the original images, a global texture representation module may be used to capture the relations and differences of multi-scale texture patterns, a texture enhancement module may be used to synchronously amplify the discriminative features by employing a semantic segmentation map-guided deep texture enhancement approach. In this way, the network can effectively learn the representative information of texture perturbation and the global trace in images. To fully evaluate the detection performance, a new dataset named DSGCG with a large data size and high diversity in resolution range, lighting condition, image source, and image scene is also provided.

As shown in FIG. 1 there is a shown a schematic diagram of a computer system or computer server 100 which is arranged to be implemented as an example embodiment of a system for detecting computer-generated images. In this embodiment the system comprises a server 100 which includes suitable components necessary to receive, store and execute appropriate computer instructions. The components may include a processing unit 102, including Central Processing Unit (CPUs), Math Co-Processing Unit (Math Processor), Graphic Processing Unit (GPUs) or Tensor Processing Unit (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service 120. The server 100 may also have a suitable operating system 116 which resides on the disk drive or in the ROM of the server 100.

The computer or computing apparatus may also provide the necessary computational capabilities to operate or to interface with a machine learning network, such as neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
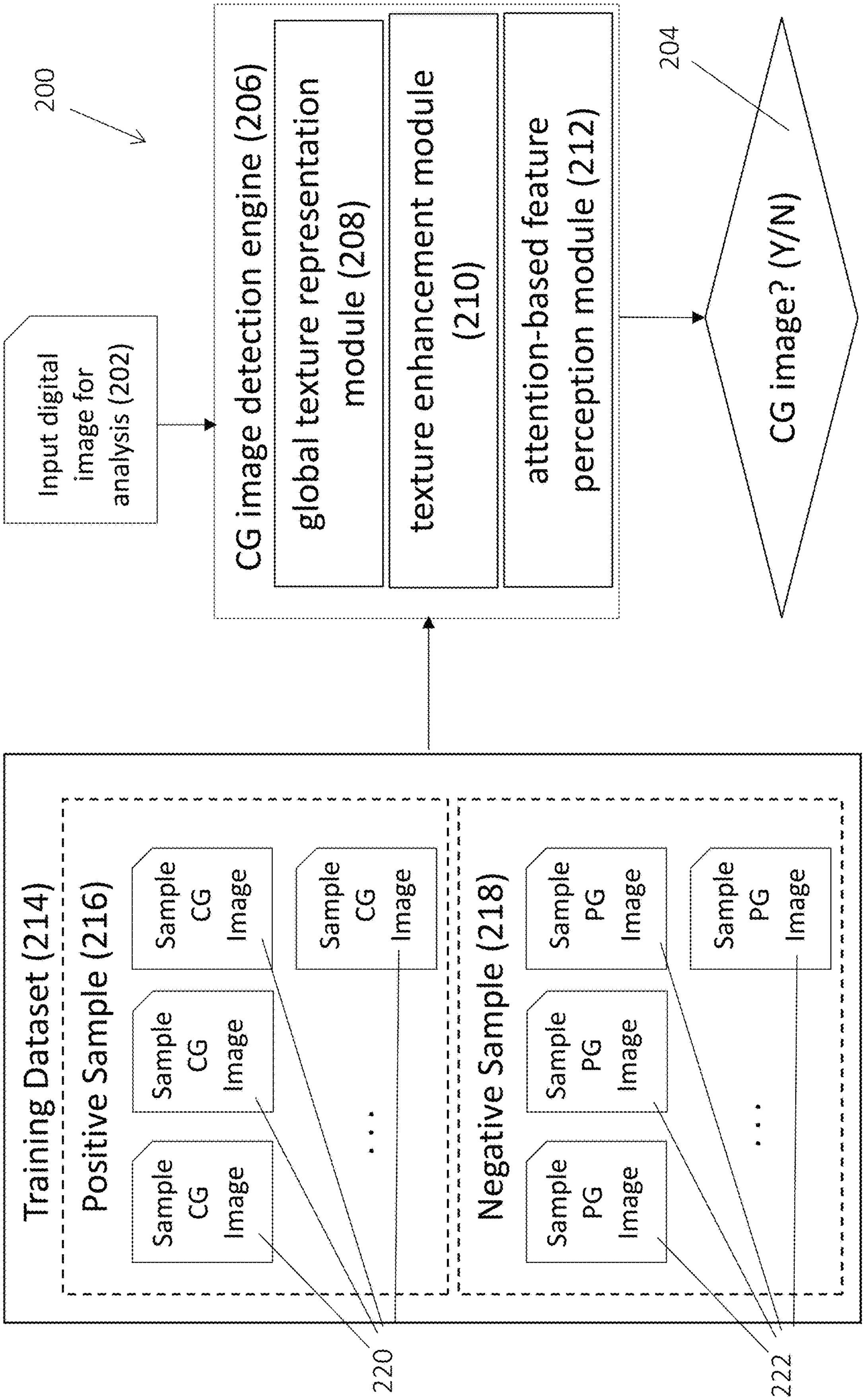
FIG. 2 is a block diagram showing a system for detecting computer-generated images in accordance with an embodiment of the present invention.

With reference to FIG. 2, there is shown an embodiment of the system 200 for detecting computer-generated images. In this embodiment, the server 100 is used as part of a system 200 as arranged to receive an input digital image 202, analyze the image 202 such as by identifying the image traces being created during generation of the image 202, such as noise signals from the image sensor or other electronics, distortion caused by the lens or other optical components, etc., or during post-generation processing operation such as image compression, noise suppression, distortion compensation, etc., and finally provide an output 204 which indicate whether the input digital image 202 is a computer-generated image or a natural photographic image based on the analysis of the image traces, such as texture perturbation, high-frequency residual or global spatial trace in the input digital image 202.

For example, a CG image with "flawless" rendered image features is provided for analysis, the image processing engine 206 may be unable to locate any image traces commonly introduced by a digital camera, since the image 202 may be generated by geometric data modeling, photo-realistic rendering or based on an artificial intelligence generative model, the system 200 may provide an output 204 indicating that the input digital image 202 is a CG image instead of a PG image. Alternatively, a PG image with abovementioned image traces maybe provided for analysis, the system may instead provide an output 204 indicating that the input digital image 202 is a PG image.

As described earlier, passive forensics of CG image detection can be categorized into two groups according to the feature extraction strategies, i.e., hand-crafted feature-based and deep learning-based.

For detection based on hand-crafted features, methods in this category may involve extracting the abnormal statistical traces left by specific graphic generation modules and use threshold-based evaluation to detect computer-generated images, for example, by revealing certain physical differences between the two image categories, such as the gamma correction in photographic images and the sharp structures in computer graphics, and then designed object geometry features for detection. This method may achieve a classification accuracy of 83.5%, outperforming the cartoon features-based and the wavelet features-based method (with accuracy of 71.0% and 80.3%, respectively). Alternatively, several visual features derived from color, edge, saturation, and texture features with the Gabor filter as discriminative features may be utilized.

Some methods emphasized that the image acquisition in a digital camera is fundamentally different from the generative algorithms deployed by computer-generated imagery. The properties of the residual image extracted by a wavelet-based denoising filter are designed for detection. For example, photo-realistic TCG images may be more surrealistic and smoother than natural images and therefore it is possible to leverage image perception characteristics to detect CG images.

Another branch of methods in this category developed texture-based methods for automatic CG and PG classification. For example, uniform gray-scale invariant local binary patterns may be used and with support vector machines 95.1% accuracy may be achieved. Alternatively, 31-dimensional statistical and textural features may be combined to discriminate the acquisition pipelines of digital images, and the performance may be improved by constructing a 9-D histogram feature and a 9-D multi-fractal spectrum feature to represent the distinct texture. In addition, the distribution of histogram, quaternion wavelet transform features, imaging and visual features, etc., may be used to detect CG images.

Methods based on hand-crafted features provide credible theoretical interpretability, but they face the following two challenges: 1) the manual design of hand-crafted features can be tedious and limited by the capacity of feature description; 2) these features tend to have poor robustness to data with a high diversity in content, acquisition device, and forgery operation.

On the other hand, detection based on deep learning may be employed, e.g. by automatic and adaptive feature learning. In the CG image detection task, for example, a statistical feature extraction may be integrated to a CNN framework to find the best feature for binary classification. Alternatively, a convolution neural network trained on image patches may be constructed and an accuracy of 98.5 can be achieved. To further improve the performance, a network with two cascaded convolutional layers at the bottom of a CNN may be designed. The network can be easily adjusted to accommodate different sizes of input image patches while maintaining a fixed depth, a stable structure of CNN, and a good forensic performance.

In an alternative example, the sensor pattern noise (SPN) with a patch-based five-layer model may be used to detect traditional CG images. Results show that the model with three high-pass filters can achieve better results than that with only one or no filter. Alternatively, a CNN-based model with channel and pixel correlation may be employed. The key component of the CNN architecture is a self-coding module that takes the color images as input to extract the correlation between color channels explicitly. Yet alternatively, a two-stream convolutional neural network, in which one stream uses a pre-trained VGG-19 network for trace learning, and the other stream preprocesses the images using three high-pass filters, may be used to help the network focus on noise-based distinct features of CG and PG images. A network based on VGG-16 and Convolutional Block Attention Module, obtaining an accuracy of 96% on DSTok dataset after experimental validation, can be used in an alternative example.

For detecting AIG images, for example, a CNN-based method that focused on the high-frequency components may achieve an average accuracy of over 98%. Alternatively, representation learning and representation comparison may be leveraged to enhance artifact learning for GAN image detection. It is also reported that a standard image classifier trained on only one specific CNN generator could generalize to unseen architectures, datasets, and training methods. Another method by checking whether an image follows the noise patterns of authentic images may be employed. Other spatial information-based methods and frequency information-based methods may perform well in specific scenarios. However, these methods may only detect CG images generated by GAN, the performance on images generated by DM or TCG images is ignored.

Preferably, the invention provides a three-class classification solution for PG, TCG, and GAN images that could provide more specific image source information, although the more realistic diffusion models-generated images may not be considered in an example embodiment. Besides, it is devised that determining whether an image was actually taken in the real world or not appears to be the priority, and it is more practical to distinguish between PG and non-PG in real world scenarios.

In typical PG image acquisition process, the optical lens first conveys the light reflected from the scene towards the color filter array (CFA), which may be a specific color mosaic that permits each pixel to gather only one particular light wavelength. Then, the output signal is sent to the imaging sensor (e.g., charged coupled device, complementary metal oxide semiconductor), which is composed of an array of photo detectors, each corresponding to a pixel of the final image. After that, the analog-to-digital converter (ADC) converts the analog signal into digital form. Further, demosaicing methods are applied to the raw data to conduct interpolation.

For kernel-based interpolation method, the process can be expressed as $V_C(x, y)=$ $$\sum_{u,v=-N}^{N} h(u, v)\tilde{V}_c(x-u, y-v),$$

where $V_C$, $\tilde{V}_C$ represent the output and the original color signals, respectively. $c \in \{R, G, B\}$, h(u, v) is the linear filter kernel function, N denotes the kernel size. After color values are recorded, more color processing operations (e.g., white balance, gamma correction) are conducted. Finally, the image data is compressed to reduce the cost of storage or transmission.

It may be observable that two levels of traces can be introduced in the generation of PG images, namely the hardware acquisition level (caused by lens, sensors) and software processing level (left by the CFA interpolation and other intrinsic image regularities). Therefore, the final traces in PG image maybe formulated as $\psi_{PG}=\{\psi_{ha}, \psi_{sp}\}$, where $\psi_{ha}$ and $\psi_{sp}$ denote the traces caused by hardware acquisition and software processing artifacts, respectively.

In fact, traces in $\psi_{ha}$ and $\psi_{sp}$ may have different representation forms. For example, the pattern traces in $\psi_{ha}$ for a specific camera with/images can be estimated by:

$$\psi_{pt} = 1/I \sum_{i=1}^{I} PN_i,$$

where $PN_i = Img_i - DN(Img_i)$, and $PN_i$ is the pattern noise of the i th image, DN(•) is the denoising operation. The lossy compression traces in $\psi_{sp}$ can be denoted by $\psi_{ct}$=RT(IDT (D×Q))−IDT(D×Q), where RT(•) is the rounding and truncation operations; Q and D are the quantization parameter and the coefficients, respectively; IDT(•) represents the inverse discrete cosine transform. All these traces will eventually affect the value of the image pixels in specific areas.

Different from the PG image acquisition process, CG images are directly generated by the computer-based algorithms for synthesis and manipulation. Taking the image generation process based on DM as an example, a diffusion model is a parameterized Markov chain trained using variational inference to produce samples matching the data after finite time.

Figure 3:
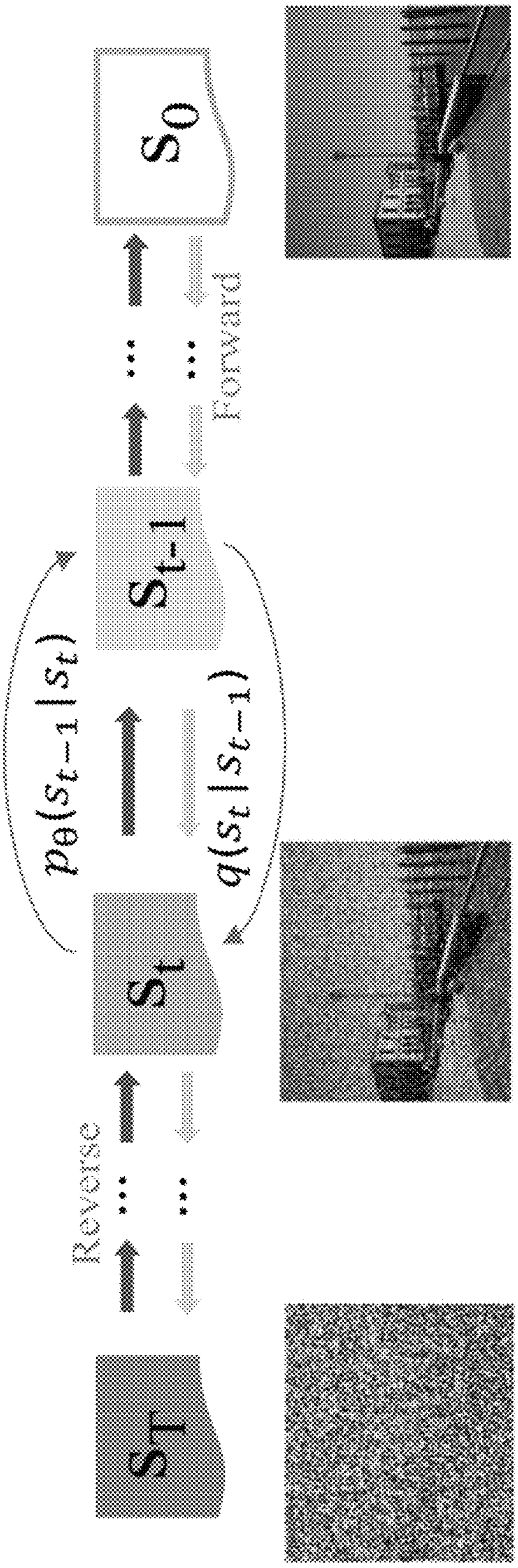
FIG. 3 is an illustration showing a typical DM image conversion.

With reference to FIG. 3, DM is based on a forward diffusion stage, in which the input data is gradually perturbed over several steps by adding Gaussian noise, and a reverse (backward) diffusion stage, in which a generative model is tasked at recovering the original input data from the diffused (noisy) data by learning to gradually reverse the diffusion process. The diffusion model may contain three typical sub-categories, i.e., stochastic differential equations (SDEs), denoising diffusion probabilistic models (DDPMs) and noise conditioned score networks (NCSNs). In general, the forward SDE is modeled by $\partial_s = f(s, t)\partial_t + \sigma(t)\partial_w$, where s and t are the data and diffusion step. σ(t) a stochastic component, ∂ represents the scale. The reverse SDE calculates the gradients of the log probability $\nabla_s \log p_t(s)$, so that s moves to regions where the data density p(s) is high. The process can be denoted by $\partial_s = [f(s, t) - \sigma(t)^2 \nabla_s \log p_t(s)]\partial_t + \sigma(t)\partial\hat{\omega}$. DDPMs perform the sampling process in the forward process from a normal distribution $N(s_t; \sqrt{1-\beta_t} s_t - 1, \beta_t I)$, where $\beta_t \ll 1$, I is the identity matrix having the same dimensions as the input image $s_0$. The process can be denoted by $s_S = \sqrt{1-\beta_t} s_{t-1} + \sqrt{\beta_t} z_t$, $z_t \sim N(0, I)$. The reverse process of DDPMs also performs iterative sampling from a normal distribution, i.e., $$s_{t-1} = \mu_\theta + \sqrt{\beta_t}\, z_t,\ z_t \sim N(0, I)$$

The forward process of NCSN simply adds normal noise to the image at the previous step via equation $$s_t = s_{t-1} + \sqrt{\sigma_t^2 - \sigma_{t-1}^2}\, z_t$$

and its reverse process is different from those of SDE and DDPMs, NCSN which adopts annealed Langevin dynamics to perform sampling.

From the above analysis, the inherent traces in the DMG images can be formulated as: $\psi_{DMG} = \psi_{ns} + \psi_{cp}$ where $\psi_{ns}$ and $\psi_{cp}$ denote the traces caused by the perturbation of noise and lossy compression of the DMG images, respectively. $\psi_{cp}$ can be calculated as «cp=RT(IDT(D×Q))–IDT(D×Q), where RT(•) is the rounding and truncation operations; Q and D are the quantization parameter and the coefficients, respectively; IDT(•) represents the inverse discrete cosine transform.

In fact, the acquisition process of CG images can be regarded as an optimization process aiming to solve the optimization problem:

$$CG^* = \underset{CG}{\text{argmin}}\{\text{Loss}(ET_{CG}, ET_{PG})\}, \text{ s.t. } d(\psi_{CG}, \psi_{PG}) < \varepsilon, \varepsilon > 0.$$

where CG* represents the optimal output CG image, $ET_{CG}$, $ET_{PG}$ denote the entities of CG and PG images, respectively. $\psi_{CG}$ and $\psi_{PG}$ are the generation traces in the CG and PG images, respectively.

From the above analysis, due to the different generation modules, the inherent traces caused by both hardware acquisition and software processing exist in PG images, while the traces in CG images are mainly caused by software manipulation. The huge difference in image generation traces in these images will inevitably cause multi-level perturbation of pixels, which in turn lead to texture dissimilarity in the local repetitive patterns and their arranged rules.

Based on the above analyses, the inherent differences in acquisition processes lead to intrinsic traces in CG and PG images, which can be reflected especially in the aspect of texture perturbation. Preferably, a novel data-driven approach which employs multi-scale deep texture learning for CG image detection is provided, in which the image traces includes multi-scale texture patterns of image features in the input digital image.

Preferably, the image processing engine 206 includes a machine-learning based processing engine, and the image processing engine 206 may comprise three main modules, namely a global texture representation module 208, a texture enhancement module 210 and attention-based feature perception module 212, referring to FIG. 2. The image processing engine may be trained by providing a training dataset 214 comprising both a plurality of computer-generated images 220 and a plurality of natural photographic image as positive samples 216 and negative samples 218 so as to train the image processing engine 206 in a machine learning process, wherein the natural photographic images 222 are generated by a digital camera.

Preferably, the global texture representation module 208 is arranged to capture relationship and differences of the multi-scale texture patterns so as a determine whether the image features are generated by a computing process or by a photographical means, the texture enhancement module 210 is arranged to amplify discriminative traces associated with the image features thereby to facilitate capturing of relationship and differences of the multi-scale texture pattern by the global texture representation module 208, and the attention-based feature perception module 212 is arranged to facilitate trace exploration in spatial and channel dimensions.

In one example embodiment, to fully exploit the trace information for CG image identification, a robust deep-learning model (also referred as "MDTL-NET" 400) that consists of heterogeneous structures for this task may be constructed. In the example with reference to FIG. 4, the process may start by leveraging Deep Parsing Network for semantic segmentation, the segmentation map is used to generate the spatial feature transformation and the produced feature maps, which are further forwarded to the deep texture enhancement module 210 for texture difference amplification. Synchronously, the input image 202 is also fed into a residual branch combined with GTRMs 208 for global texture representation. Next, the original image 202 and the high-frequency component of the enhanced image are forwarded to the attention-based feature perception modules (AFPM) 212 containing Conv-Pool blocks (a convolution layer followed by an average-pooling layer) and a channel-spatial attention module (CSAM) for learning the representative information. The output high-level features are concatenated and fed into a fully connected layer and a softmax layer to obtain the output probability 204 of whether the input image is a PG or CG image.

The introductions of the global texture representation module 208 and deep texture enhancement module 210 are detailed as follows. Specifically, the convolution layers with kernel sizes of 5×5, 1×1 and stride of 1, followed by batch normalization (BN) and rectified linear unit 6 (ReLU6) activation function are added to the AFPM. Batch normalization and ReLU6 are adopted to prevent the network from overfitting and to increase the nonlinearity of the network, respectively. The element-wise function of ReLU6 can be formulated as ReLU 6(i)=min(max(0,i), 6), where i is the input signal. Right after the three components, the average-pooling rather than the max-pooling layer is adopted to focus more on local characteristics, and facilitate the learning of computer-generated traces. The process can be expressed as:

$$FM_{out} = AP(\min(\max(0, [Conv(FM_{in})]), 6)) \tag{1}$$

where $FM_{out}$ and $FM_{in}$ are the output and input feature maps. [·] represents extracting the elements after batch normalization, AP(•) is the average-pooling operation.

Since the generated intrinsic traces are less salient than the image content information, the attention mechanism, which mainly consists of two parts, is adopted to facilitate the learning of such trace information. The first part is a channel attention scheme (ATc(•)) that weights the input feature of different channels (FMc in). The second part is the spatial attention scheme (ATs(•)), and a lightweight and flexible convolutional block attention module similar to a spatial attention module may be use to improve the representation of interests. The process can be formulated as follows:

$$FM^s_{out} = ATs(ATc(FM^c_{in})) \tag{2}$$

where $FM^c_{in}$ denotes the input of the channel attention submodule, and $FM^s_{out}$ represents the output of the spatial attention submodule.

After the attention module 212, another Conv-Pool block is added to the AFPM. The receptive field in this block may be restricted by using 1×1 kernel sizes with strides of 1×1 for the convolutional layers.

In terms of the output of the framework, as formulated in Eq. 3, the refined features are concatenated for classification, and the results on whether the input image is a CG or PG can be reported in the form of 0 or 1 through a fully-connected layer and a softmax layer, where 1 represents CG image, and 0 denotes PG image.

$$\text{Output} = SoM(FC(Concat(ft_1, ft_2, ft_3))) \tag{3}$$

where $ft_1$,$ft_2$,$ft_3$ are the refined high-level features. FC(•) is the fully-connection operation. SoM(•) is the softmax operation.

Figure 4:
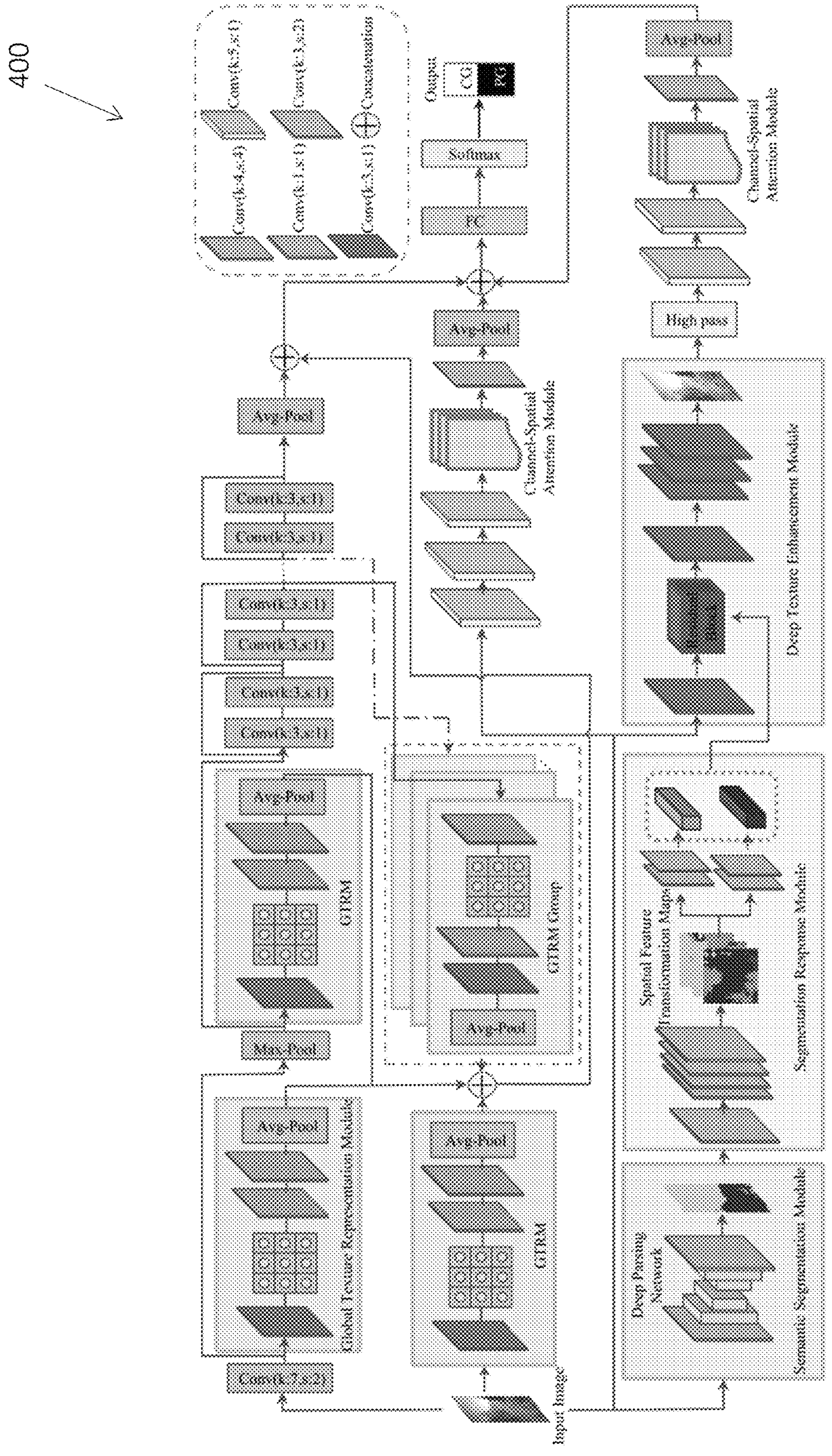
FIG. 4 is an overall structure of the system for detecting computer-generated images, i.e. the MDTL-NET detection network.

Preferably, GTRM 208 may be constructed to enhance the texture feature representation. Referring to FIG. 4, preferably, the global texture representation module 208 incorporates ResNet architecture. For example, Resnet-18 equipped with 6 GTRM 208 may be inserted in MDTL-NET 400, GTRM 208 consists of at least one, preferably three, convolution layers, one Gram matrix-based activation layer, and a global pooling layer. The batch normalization (BN) and rectified linear unit may be applied after each of the last two convolutional layers. The global texture representation procedure can be summarized as:

$$TE(F_{in}^G) = AP\left(Cv\left(Cv\left(Gm\left(Cv\left(F_{in}^G\right)\right)\right)\right)\right) \tag{4}$$

where Gm(•) is the Gram matrix-based activation, $F^G_{in}$ denotes the input feature map.

The activation performs the following calculation to achieve a good description of global texture.

$$Gm_{pq}(w) = \sum_t \mathbb{F}_{pt}(w)\mathbb{F}_{qt}(w) \tag{5}$$

where $F_{pt}(w)$ and $F_{qt}(w)$ denote the $t^{th}$ elements in the $p^{th}$ and $q^{th}$ feature maps of layer w, respectively.

For a given feature map of layer w, the pixel-level elements can be represented by:

$$\mathbb{F}_p(w) = (m_{ij})_{I \times J} = \begin{bmatrix} m_{11} & m_{12} & \dots & m_{1J} \\ m_{21} & m_{22} & \dots & m_{2J} \\ \dots & \dots & m_{ij} & \dots \\ m_{I1} & m_{I2} & \dots & m_{IJ} \end{bmatrix} \tag{6}$$

where $m_{i,j}$ is the value of pixel located at (i, j). I and j indicate the row and column in the map, respectively.

Then, the activation descriptor for the input feature map can be calculated as:

$$Gm(w) = \begin{bmatrix} \mathbb{F}_1^T\mathbb{F}_1 & \mathbb{F}_1^T\mathbb{F}_2 & \dots & \mathbb{F}_1^T\mathbb{F}_J \\ \mathbb{F}_2^T\mathbb{F}_1 & \mathbb{F}_2^T\mathbb{F}_2 & \dots & \mathbb{F}_2^T\mathbb{F}_J \\ \dots & \dots & \mathbb{F}_i^T\mathbb{F}_j & \dots \\ \mathbb{F}_I^T\mathbb{F}_1 & \mathbb{F}_I^T\mathbb{F}_2 & \dots & \mathbb{F}_I^T\mathbb{F}_J \end{bmatrix} \tag{7}$$

The descriptor enhances texture feature learning by simulating the texture analyzing method based on gray level co-occurrence matrix.

In addition, texture difference amplification may facilitate CG image detection, and preferably, the image processing engine 206 further comprises a texture enhancement module 210 arrange to amplify texture differences of the multi-scale texture patterns. For example, the texture enhancement module 210 is arranged to amplify discriminative traces associated with the image features thereby to facilitate capturing of relationship and differences of the multi-scale texture pattern by the global texture representation module 208.

Figure 5:
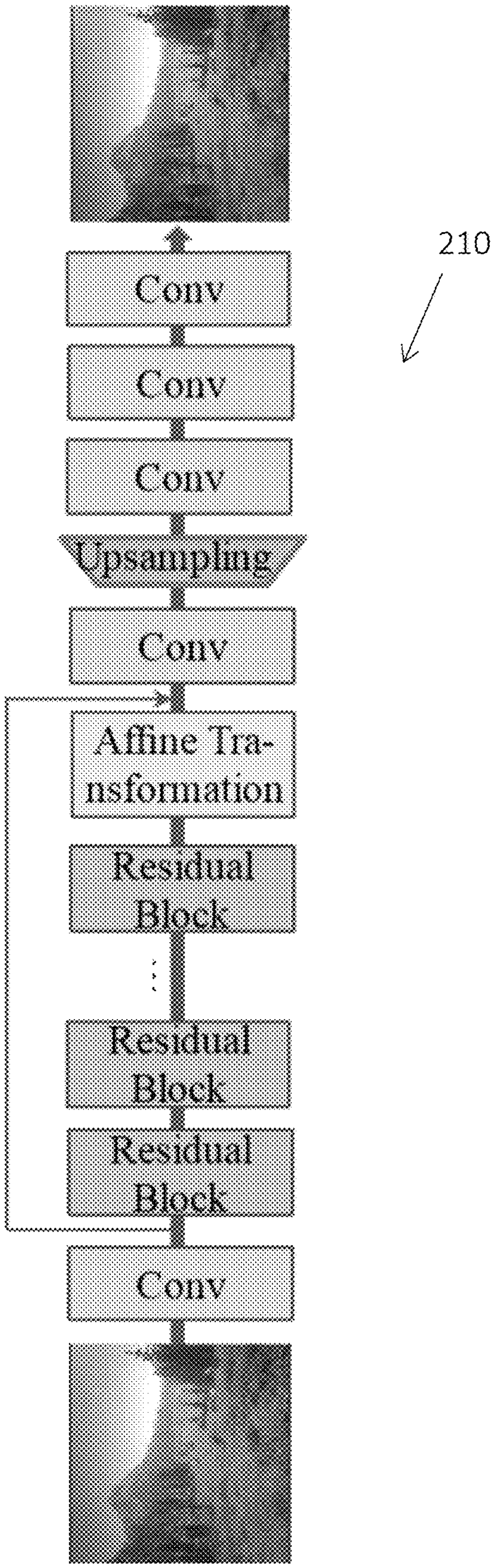
FIG. 5 is an illustration showing a structure of the deep texture enhancement module.

In one preferred embodiment, with reference to FIG. 5, the texture enhancement module 210 may comprise one ore more convolutional layers, semantic segmentation map-guided residual blocks, associated affine transformations and upsampling module. Preferably, the discriminative traces are amplified based on a semantic segmentation map guided affine transformation operation and convolutional neural networks-based texture recovery.

Figure 6:
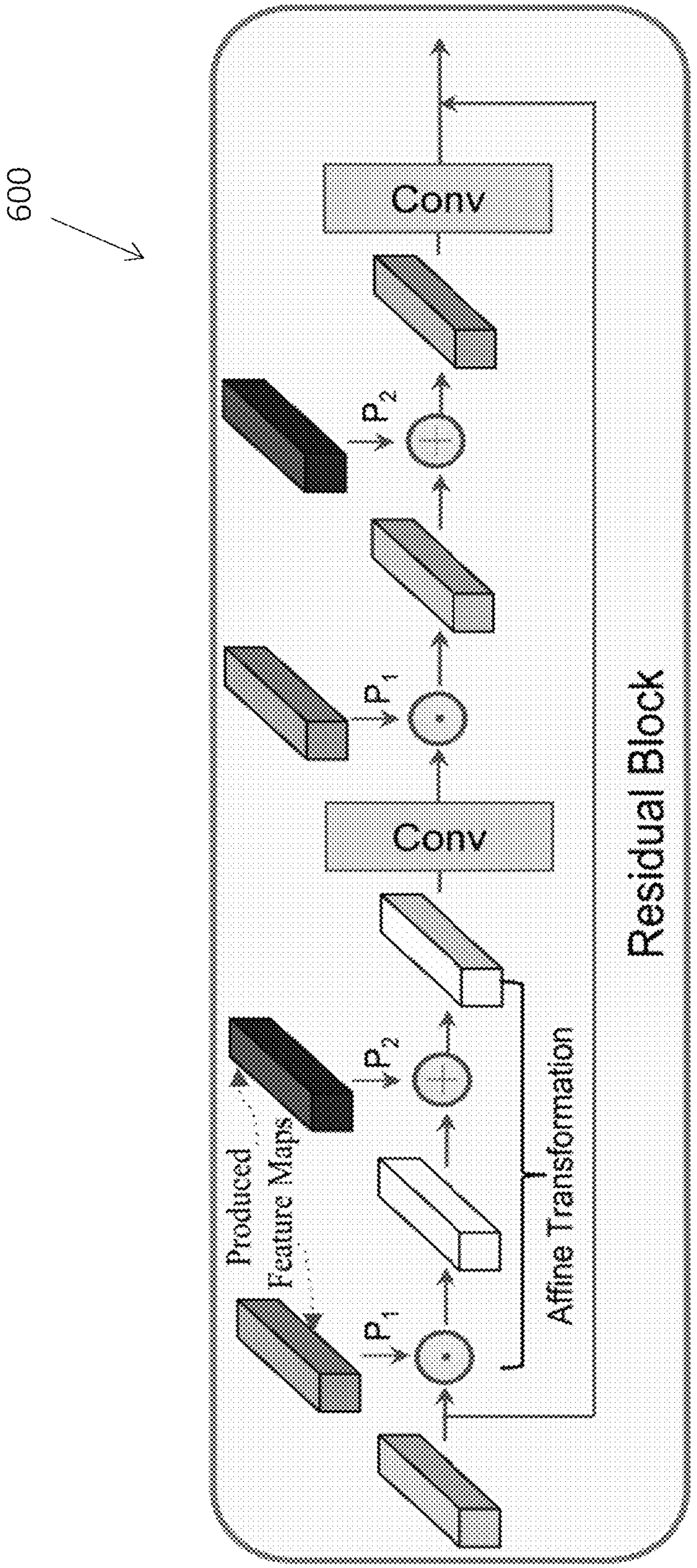
FIG. 6 is an illustration of the residual block. $P_1$ and $P_2$ represent the transformation parameters, which are obtained based on the produced feature map.

The input and output channels, kernel size, and stride of the first and last two convolutional layers are (3, 64, 3, 1) and (64, 3, 3, 1), respectively, while the remaining convolutional layers are set to (64, 64, 3, 1), the four numbers in parentheses represent the values of the corresponding parameters respectively. The 16 residual blocks using a similar structure to the spatial feature transform network consist of two cascaded affine transformation submodules and two convolutional layers to perform feature-wise manipulation and spatial-wise transformation. An example structure 600 is shown in FIG. 6, and its process can be formulated as follows:

$$FM_{out}^r = Conv\,(\,AT\,(Conv(AT(FM^{r_{in}}))) \tag{8}$$

where AT(•) denotes the affine transformation, $FM^r_{in}$, $FM^r_{out}$ denote the input and the output of the residual block, respectively.

As earlier described, the image processing engine 206 may further comprise a deep parsing network, and the deep parsing network may be used to generate a segmentation map for the semantic segmentation map guided affine transformation operation, and intermediate spatial feature transformation maps and feature maps associated with the image features for further process by the affine transformation module.

For example, these blocks take the feature map from the previous layer as input, and applies two affine transformations, which modulate the feature map with a set of parameters ($P_1$, $P_2$) obtained by applying a learnable mapping function MAP based on the segmentation maps Θ, i.e., MAP:Θ→($P_1$, $P_2$). In short, the affine transformation can be formulated as follows:

$$AT(FM) = FM \otimes P_1 + P_2 \tag{9}$$

where ⊗ represents the element-wise multiplication, and FM is the feature map with the same dimension as $P_1$ and $P_2$.

Preferably, semantic segmentation maps in the segmentation response module may be used to obtain the produced feature maps to guide the affine transformation operation. Specifically, the Deep Parsing Network may be adopted for semantic segmentation. The method incorporates high-order relations and a mixture of label contexts into the Markov Random Field (MRF), and it solves MRF by proposing a CNN that yields promising segmentation accuracies on several large-scale datasets. Then, the segmentation maps Θ may be taken as the input of the segmentation response module, which are then fed to five consecutive convolutional layers. The generated intermediate spatial feature transformation maps are processed by two sets of convolutional modules, each containing two convolutional layers. Then, two produced feature maps are obtained, which are shared by the residual blocks. Note that the convolutional layers are with kernel size of 1×1.

After the residual blocks and an additional affine transformation module, and following the convolutional layer, the nearest neighbor upsampling is employed at the back end of the enhancement module. Besides, skip connection is adopted to ease the training process. In one example embodiment, adversarial learning is also adopted to make the enhanced images as realistic as possible. A VGG-style network is used as the discriminator. The enhancement module and the discriminator are jointly trained with an adversarial loss $L_{ad}=\Sigma_i \log(1-D(G(x)))$ and a learning objective as follows:

$$\min_{G}\max_{D} V(D, G) = \mathop{\mathbb{E}}_{y\sim pr}[\log D(y)] + \mathop{\mathbb{E}}_{x\sim po}[\log(1 - D(G(x)))] \tag{10}$$

where pr and po represent the distributions of enhanced and original images, respectively. G(•) denotes the enhancement module.

Figure 7A:
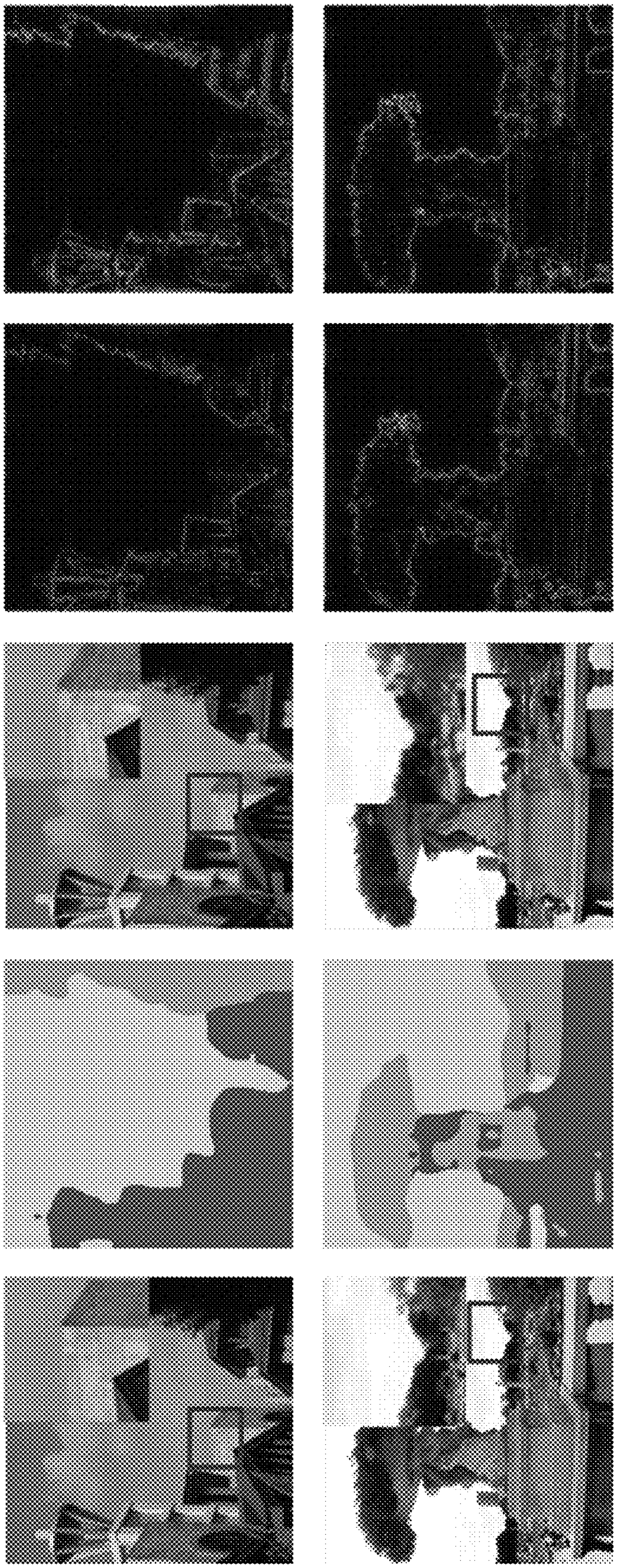
FIG. 7A is a set of visualization of deep texture enhancement and the high-frequency components of the original and the enhanced images. From left to right, each column in represents the original images, the semantic segmentation images, the enhanced images, and the high-frequency components of the original and the enhanced images, respectively. The original image is obtained from the PG dataset. The corresponding zoomed version of the contents marked with red boxes are also shown in the corner of the images.
Figure 7B:
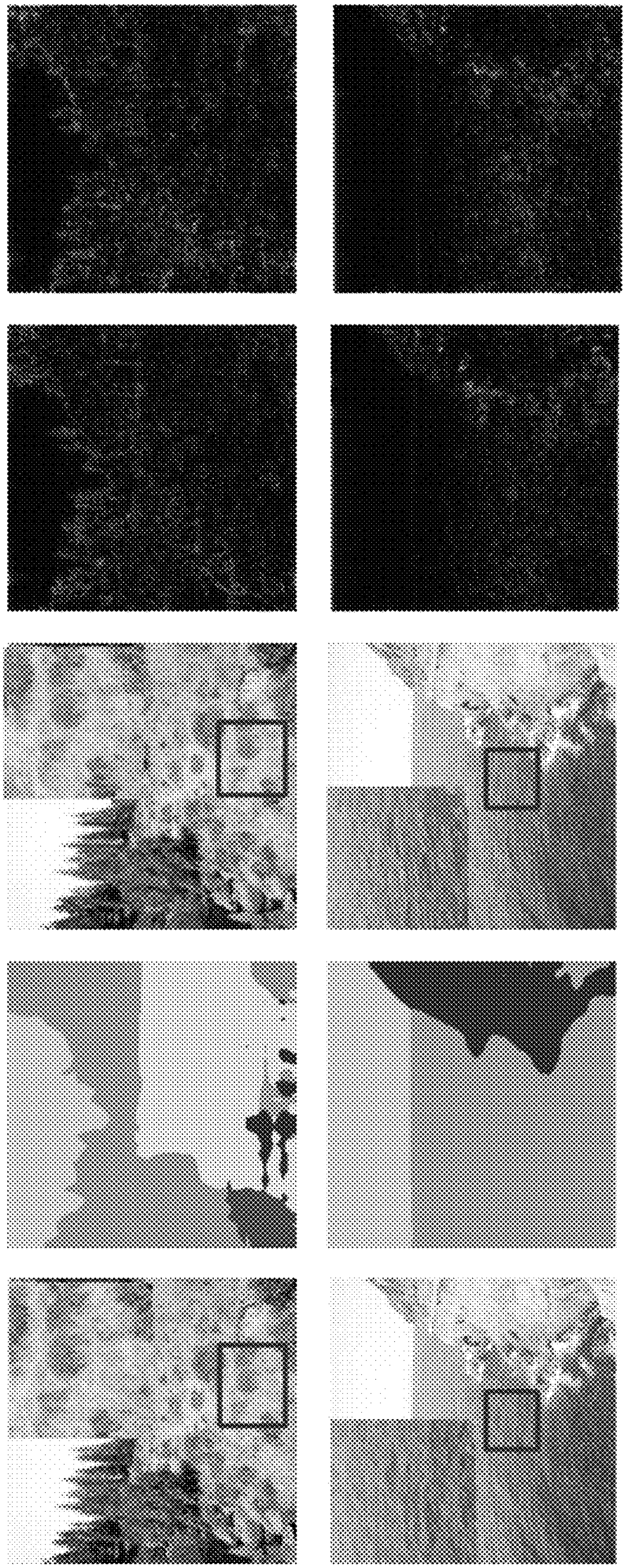
FIG. 7B is an alternative example of visualization of deep texture enhancement and the high-frequency components of the original and the enhanced images with an original image obtained from the PG dataset, different from FIG. 7A.
Figure 7C:
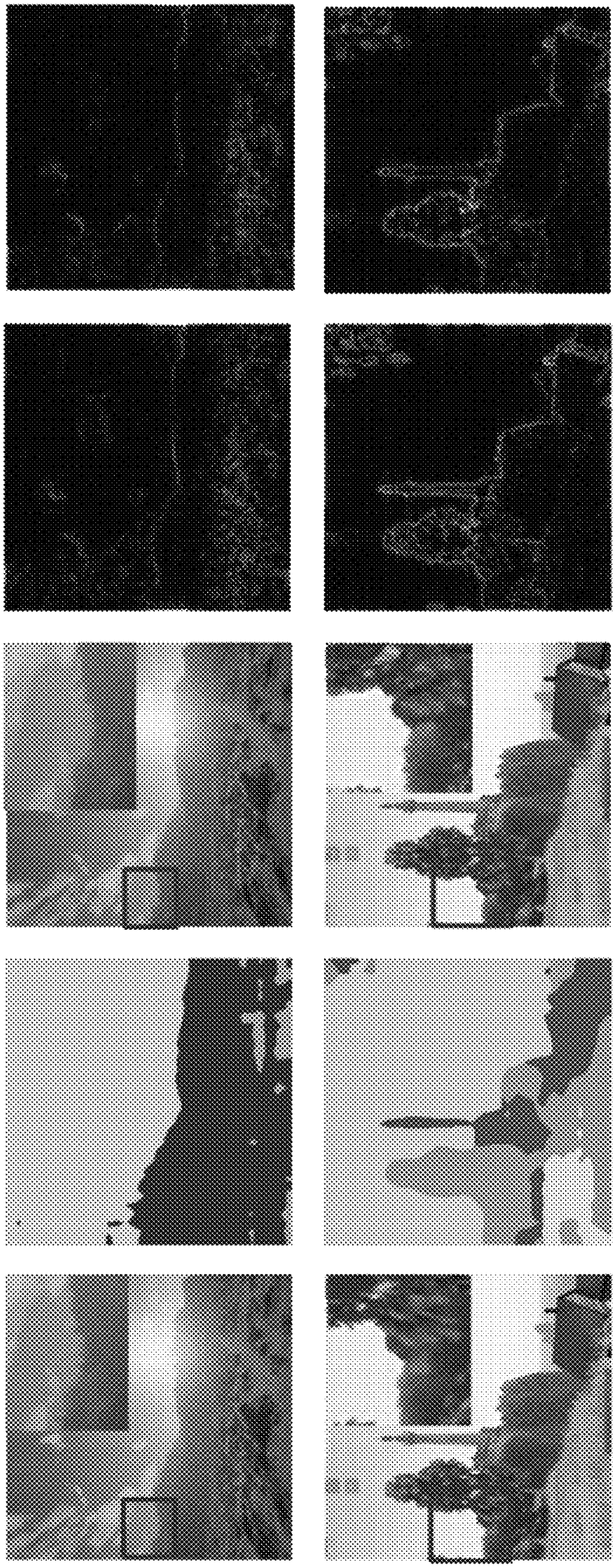
FIG. 7C is an alternative example of visualization of deep texture enhancement and the high-frequency components of the original and the enhanced images with an original image obtained from the CG dataset, different from FIGS. 7A and 7B
Figure 7D:
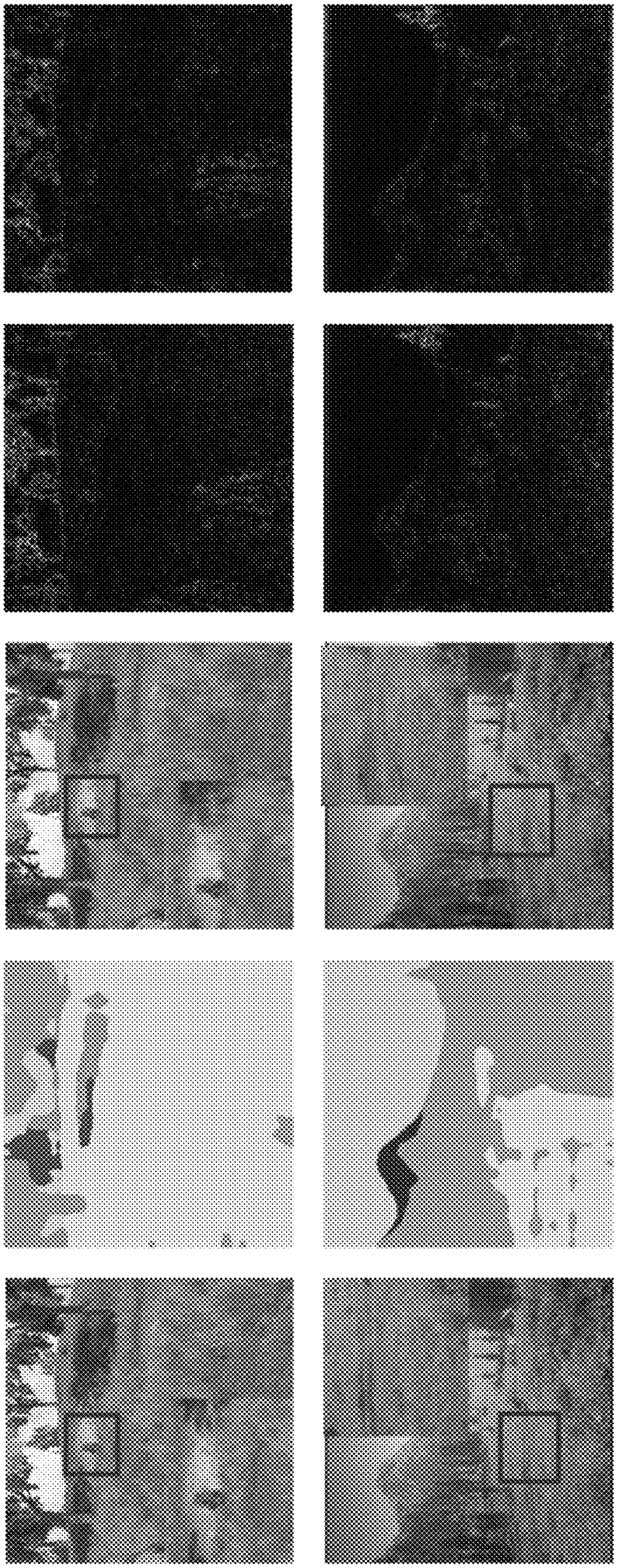
FIG. 7D is an alternative example of visualization of deep texture enhancement and the high-frequency components of the original and the enhanced images with an original image obtained from the CG dataset, different from FIG. 7C.

For the clarification of explanation, the effectiveness of deep texture enhancement using the examples in FIGS. 7A to 7D is demonstrated, which shows the visualization of deep texture enhancement and the high-frequency components of the original and the enhanced images. As can be seen from the third column in each subfigure, after semantic segmentation, the objects of different categories in both CG and PG images are well segmented. Based on the segmentation map, the texture of the original image becomes more fine-grained after the enhancement operation. After high-pass filtering, the high-frequency components of the enhanced image and the original image show some differences, with the former shows more detailed information. In addition, it can be found that the intensities of the high-frequency components of the PG images in FIGS. 7A to 7B is increased significantly, while those in the CG images in FIGS. 7C to 7D show slight decrease. The finding reveals the evidence that the enhancement module brings a considerable and complementary difference in high-frequency components of the CG and the PG images, which is crucial for the improvement of the detection ability of the model.

In addition, the image processing engine 206 further comprises an attention-based feature perception module 212 arranged to facilitate trace exploration in spatial and channel dimensions. Attention mechanism is flexible and capable of capturing long-range feature interactions and boosting the representation capability of convolutional neural networks. Preferably, the channel-spatial attention module comprises a channel attention submodule ATc(•) and a spatial attention submodule ATs(•) connected in a sequential order, where the output of ATc(•) will be the input of ATs(•). More precisely, the input and output feature maps of the channel attention submodule are denoted as $FM^c_{in}$, $FM^c_{out}$, respectively. The channel attention submodule generates a 1-dimensional channel attention map Mc(•), and perform element-wise multiplication on the input feature map. Therefore, $FM^c_{out}$ can be formulated as $FM^c_{out}=Mc(FM^c_{in})\otimes FM^c_{in}$, where $\otimes$ is the element-wise multiplication. Similarly, the output feature map of the spatial attention submodule $FM^s_{out}$ can be calculated as $FM^s_{out}=Ms(FM^c_{out})\otimes FM^c_{out}$, where Ms(•) is a 2-dimensional spatial attention map.

Figure 8:
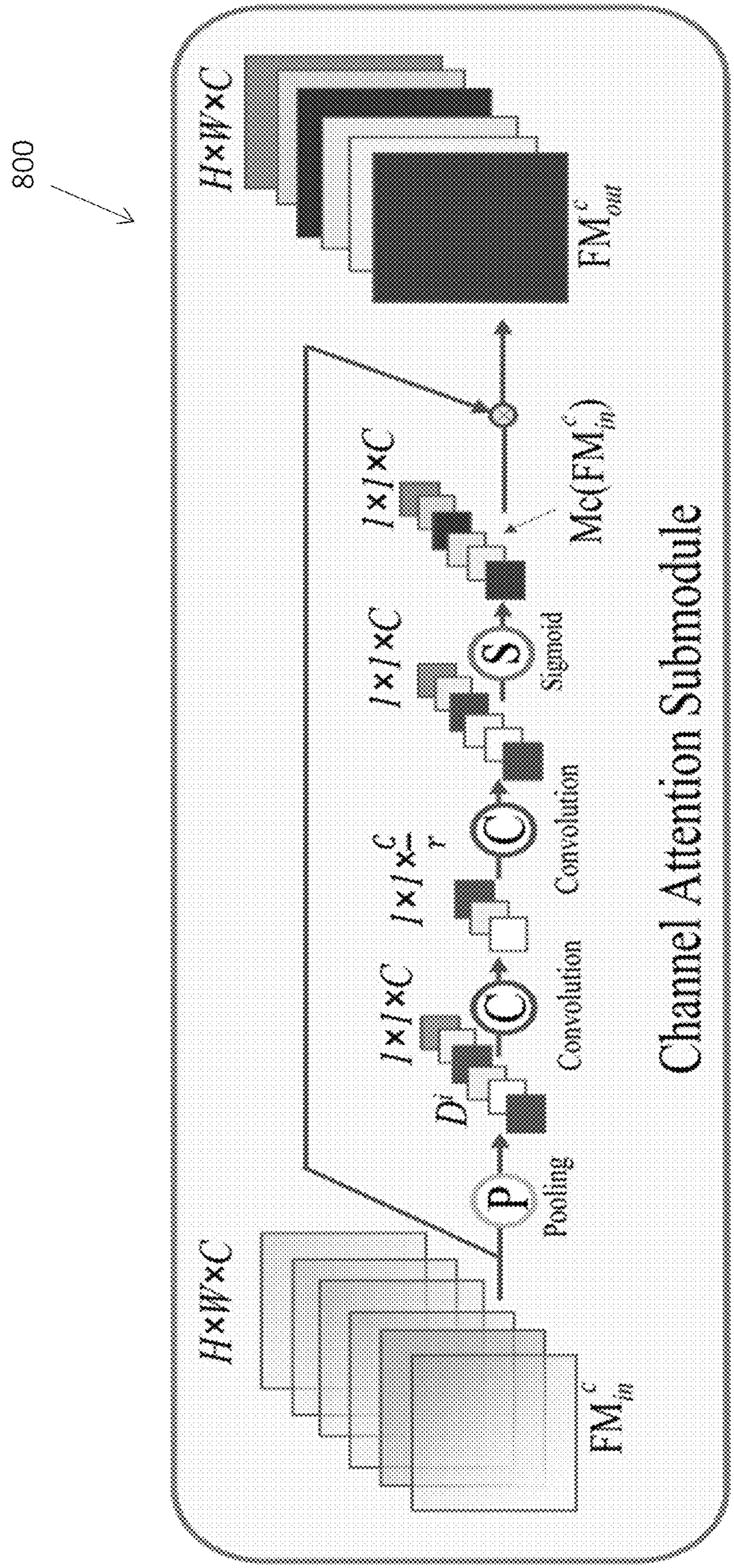
FIG. 8 is an illustration of the channel attention submodule.

Preferably, channel attention is added to the model to learn the weight of each channel. The illustration of the channel attention submodule 800 is shown in FIG. 8. The input of the submodule is a combination of single feature maps with size H×W, which can be represented by, $FM^c_{in}=[FM^1_{in}, FM^2_{in}, \ldots, FM^i_{in}, \ldots, FM^C_{in}]$, $FM^c_{in}$ in the formula denotes the input, i and C are the index and the total number of feature maps, respectively. These feature maps are squeezed into C feature maps of size 1×1 in the spatial dimension by using global average-pooling. The $i^{th}$ element of the channel-wise statistic can be calculated as follows:

$$D^i = \frac{1}{W\times H}\sum_{h=1}^{H}\sum_{w=1}^{W} v^i(h, w) \tag{11}$$

where $v^i(h,w)$ is the value at position (h,w) of $FM^i_{in}$.

Then, a convolution layer with a kernel size of 1×1 is used to perform channel-downscaling on channel-wise statistics. With the scaling ratio set to r, the output statistic of size 1×1×C r can be obtained. Further, the downscaled statistic is upscaled with ratio r by putting through the second convolutional layer. After obtaining the recovered feature map of size 1×1×C, it is fed into a sigmoid gate, which further outputs the final channel attention map. Finally, the input features are multiplied by the final 1-dimensional channel weights $Mc(FM^c_{in})$ to get the refined features $FM^c_{out}$. In short, the channel attention procedure can be summarized as follows:

$$FM^c_{out} = Sig(Conv(Conv(AP(FM^c_{in})))) \otimes FM^c_{in} \tag{12}$$

where Sig(•) is the sigmoid function, which can be represented by $fsig(x)=1/(1+e^x)$. Conv(•) denotes the convolution operation. AP(•) is the average-pooling operation.

Figure 9:
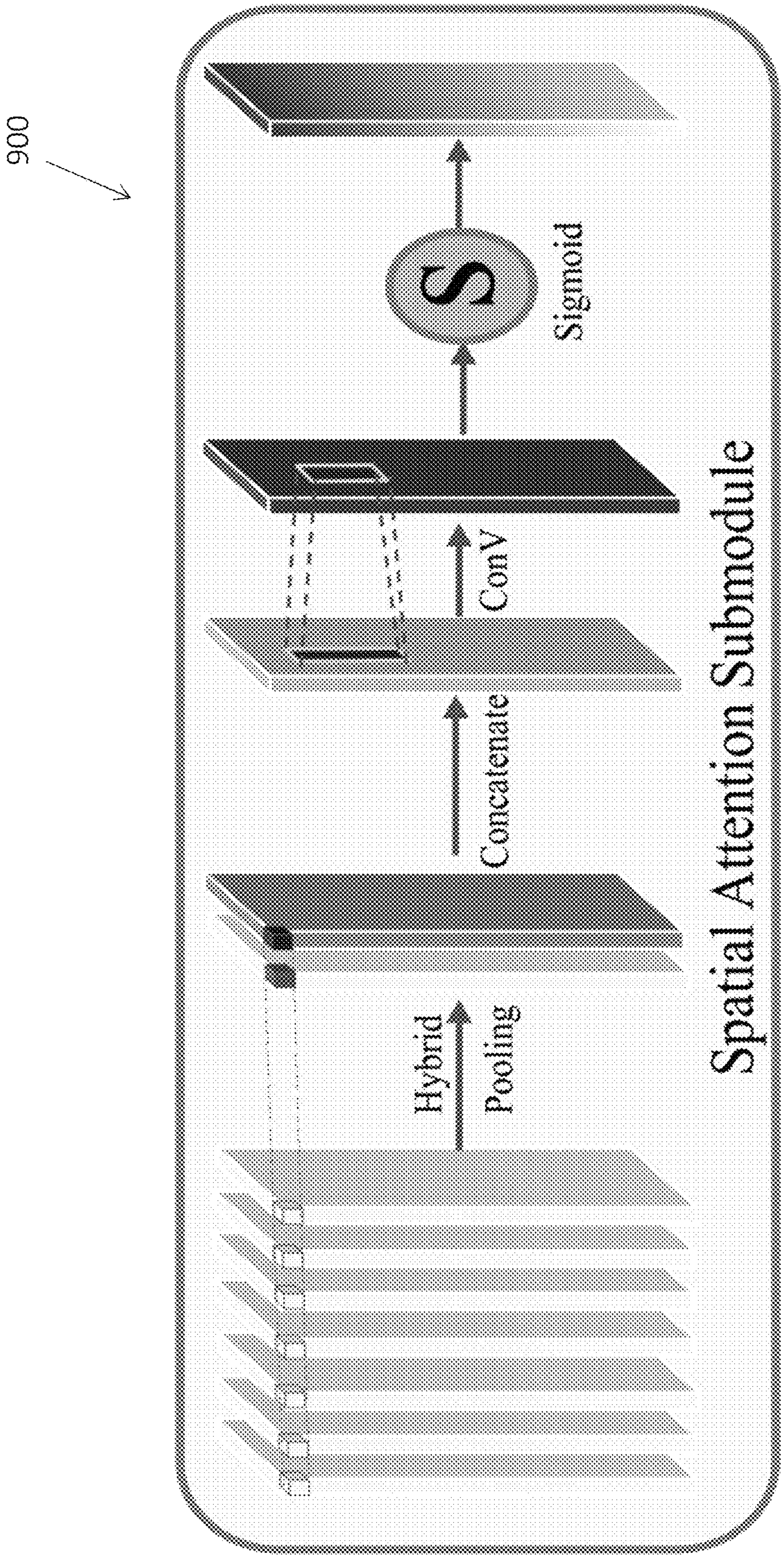
FIG. 9 is an illustration of the spatial attention submodule.

Different from the channel attention submodule, the spatial attention submodule focuses on where is an informative part, which can provide information complementary to those of the channel attention mechanism. The illustration of the spatial attention submodule 900 is shown in FIG. 9. Firstly, a hybrid pooling operation consisting of an average-pooling and a max-pooling along the channel axis may be employed to summarize the average presence of the feature and the most activated presence of the feature, respectively. Then, these two pooled features may be concatenated to generate an efficient feature descriptor, which is further convolved by a standard convolution layer. The output is also fed to a sigmoid gate in order to generate the 2-dimensional spatial attention map $Ms(FM^c_{out})$. In some example scenarios, the spatial attention map encodes where to emphasize or suppress. Similarly, the procedure can be summarized as:

$$Ms(FM^c_{out}) = Sig(Conv([AP(FM^c_{out}), MP(FM^c_{out})])) \tag{13}$$

where AP(•) and MP(•) denote average-pooling and max-pooling operations, respectively.

In addition, the image processing engine 206 further comprises a fully connected layer and a softmax layer arranged to determine an output probability of whether the input digital image 202 is a computer-generated image or a natural photographic image based on concatenated high-level features obtained by the global texture representation module 208, the texture enhancement module 210 and the attention-based feature perception module 212.

In one example embodiment, following the channel attention and spatial attention submodules, a Conv-Pool block is added to each channel. Finally, the classification results can be obtained through a fully-connected layer and a softmax layer.

The inventors conducted experiments to evaluate the performance of the system in accordance with embodiments of the present invention. The experiments were conducted on a workstation with an Intel® Core™ i7-10700 CPU (2.90 GHz) processor, an NVIDIA Geforce RTX 3060 graphics card, and 64G DDR4 2666 MHz memory.

The performance of the system is evaluated on a newly constructed dataset (named DSGCG) with a high data diversity, and three public datasets (i.e., DSRah dataset, DSTok dataset, and DSMan dataset), and the image processing engine is trained by providing both a plurality of computer-generated images and a plurality of natural photographic image as positive samples and negative samples so as to train the image processing engine in a machine learning process, wherein the natural photographic images are generated by a digital camera.

DSGCG dataset: There are 42000 CG images and 42000 PG images sized from 256×256 to 4928×3264 with moderate to good visual quality in the DSGCG dataset. The CG set contains traditional CG images, GAN images, and DM images. TCG image set was constructed by collecting CG video or game screenshots (namely Forza Horizon, GANTZ, God of War, Red Dead Redemption, and Playerunknown's Battlegrounds) from Kaggle and websites. Pretrained StyleGAN2, ProGAN, and BigGAN models were used for GAN images generation (Total number: 18000, each GAN contains 6000 images with six categories). Stable diffusion, Latent diffusion, and DALL·E Mini were adopted to generate 18000(=6000+6000+6000) DM images, respectively.

For images in the PG set, 402 images with different contents were taken by using a NIKON D5200 camera, the focal length and exposure time are 25 mm and 1/200 second, respectively. 1600 and 5998 images were downloaded from the Columbia and RAISE datasets. 24000 were downloaded from the LSUN dataset. Since grayscale images are also widely used in real scenario, 10000 grayscale PG images in BOSSbase v1.01 dataset were also collected to enhance the diversity of images. Due to the inconsistent sizes, the images were cropped to 256×256, and divided into training, test, and validation sets at ratio of 5:1:1. There is no lossy compression trace introduced to these images in the cropping process. In the experiments, CG images were defined as positive samples and PG images as negative samples. However, it is appreciated by a skilled person in the art that the definition of positive or negative samples/results may be interchanged as desired.

DSRah dataset: This dataset consists of 1800 CG images downloaded from the Level-Design Reference Database 3. The author selected five different video-game screenshots (i.e., Witcher 3, Battlefield 4, Battlefield Bad Company 2, Grand Theft Auto 5, and Uncharted 4) to construct the dataset. The PG set is made up of 1800 natural images taken from the RAISE dataset.

DSTok dataset: This dataset contains 4850 CG images and 4850 PG images collected from the Internet. PG images include indoor and outdoor landscapes captured by different devices, and CG contents also contain different scenes. All the images are in JPEG format, and the file sizes are between 12 KB to 1.8 MB.

DSMan dataset: This dataset contains 4000 TCG images, 4000 GAN and 4000 PG images. GAN images were generated using the pretrained models. PG and TCG images were selected from the Computer Graphics versus Photographs dataset.

The summary of the datasets is shown the table as shown below. It can be found that the DSGCG dataset has a larger number of images and is more diverse than other datasets in terms of resolution range, image source and scene coverage.

| | | DSGCG (The Proposed) | DSRah [46] | DSTok [52] | DSMan [11] |
|---|---|---|---|---|---|
| Year | | 2023 | 2017 | 2013 | 2022 |
| Resolution | Min | 256 × 256 | 1680 × 1050 | 609 x 603 | 256 × 256 |
| | Max | 4928 × 3264 | 4928 x 3264 | 3507 x 2737 | 3507 x 2737 |
| Number | Total | 84000 | 3600 | 9700 | 12000 |
| | CG | 42000 | 1800 | 4850 | 8000 |
| | PG | 42000 | 1800 | 4850 | 4000 |
| Image Source | CG | TCG (Kaggle, Google), GAN images (StyleGAN2, ProGAN, BigGAN), DM images(Stable Diffusion, DALL-E Mini, Latent Diffusion) | TCG (LDRD) | TCG (Internet) | TCG (Internet), GAN images (StyleGAN(2), ProGAN) |
| | PG | RAISE (Nikon D40, D90, D7000), Columbi (Canon G3) BOSSbase v1.01 (Canon EOS 7D/40D/400D/DIGITAL REBEL XSi, PENTAX-K20D, m9, NIKON D70), Personal Collection (Nikon D5200), LSUN (Internet) | RAISE (Nikon D40, D90, D7000) | Internet | Internet |

-continued

| | DSGCG (The Proposed) | DSRah [46] | DSTok [52] | DSMan [11] |
|---|---|---|---|---|
| Scene Coverage | Outdoor, Indoor, Landscape, Nature, People, Objects, Buildings, Animal | | | |
| | Light, Flame, Nighttime, Grayscale images | — | — | — |

The image processing engine is constructed using Pytorch-1.11.0 4 with CUDA-11.3 and Torchvision0.12.0 package and trained with Adam optimizer of learning rate 0.00001. The random horizontal and vertical flip probabilities are set to 0.3. The batch size is set to 30, and the maximum number of epochs is fixed at 400. The cross-entropy loss is used to train the network.

Accuracy (ACC), True Positive Rate (TPR), and True Negative Rate (TNR) are used for performance evaluation, which can be expressed as:

$$ACC = \frac{TP + TN}{P + N} \times 100\%,$$

$$TPR = \frac{TP}{TP + FN} \times 100\% \text{ and } TNR = \frac{TN}{TN + FP} \times 100\%$$

where TP, TN, FP, and FN in the formulas denote the number of true positive, true 10 negative, incorrectly identified, and incorrectly rejected samples, respectively. P and N represent the number of positive and negative samples.

The performance of the system on four CG image detection datasets, including the DSGCG, DSRah, DSTok and DSMan datasets is summarized reported in the following Table

| DSGCG Dataset | | | DSRah Dataset | | | DSTok Dataset | | | DSMan Dataset | | |
|---|---|---|---|---|---|---|---|---|---|---|---|
| ACC (%) | TPR (%) | TNR (%) | ACC (%) | TPR (%) | TNR (%) | ACC (%) | TPR (%) | TNR (%) | ACC (%) | TPR (%) | TNR (%) |
| 95.38 | 95.44 | 95.32 | 97.03 | 96.78 | 97.28 | 96.58 | 96.15 | 97.01 | 95.15 | 94.28 | 96.02 |

Results show that the system achieves consistently higher accuracies on DSGCG, DSRah, DSTok, and DSMan datasets. The average accuracy of the system is 96.04%. For the performance on the DSGCG dataset, MDTL-NET achieves the average accuracy rate of 95.38%. It can also be observed that the TPRs and TNRs of the system are considerably promising in most cases, with the values being (95.44%, 95.32%), (96.78%, 97.28%), (96.15%, 97.01%), and (94.28%, 96.02%) on DSGCG, DSRah, DSTok, and DSMan datasets, respectively, which imply the detection abilities of positive samples and negative samples are relatively balanced.

Advantageously, the high performance of the system can be attributed to the enhanced image texture representation and texture difference amplification, which facilitate the MDTL-NET to effectively learn the discriminative trace information instead of focusing on image content information.

It is possible that CG images may be misclassified as PGs, or PG images may be misclassified as CG images. It can be found that changes in illumination may affect the performance of the approach. If the scene contains dramatic illumination or color changes, it may mislead the detection network to output wrong recognition results. In summary, these results still clearly demonstrate the effectiveness of the CGs identification.

To further demonstrate the contribution of different modules in the detection model, the impact of different parameters or network architecture settings on the detection performance on the DSGCG dataset is shown. Specifically, the following settings are considered to compare the detection performance: without high-pass filtering, no random horizontal/vertical flip, different arrangements of attention submodules (only channel, only spatial, spatial+channel), different learning rate, texture enhancement disabled, and the use of Averaged Stochastic Gradient Descent (ASGD) optimizer. When modifying one module, other settings may be kept the same. For the two cases of no high-pass filtering and no texture enhancement, these modules may be removed without modifying other modules. The comparison results are summarized as follows.

| | Criteria(%) | | |
|---|---|---|---|
| Settings | ACC | TPR | TNR |
| An example of the invention | 95.38 | 95.44 | 95.32 |
| Without high-pass filtering | 91.70 | 88.43 | 94.97 |

-continued

| | Criteria(%) | | |
|---|---|---|---|
| Settings | ACC | TPR | TNR |
| No random horizontal flip No | 94.58 | 94.66 | 94.50 |
| random vertical flip | 94.07 | 94.28 | 93.86 |
| Spatial + Channel | 93.20 | 93.07 | 93.33 |
| Only Channel | 90.15 | 91.28 | 89.02 |
| Only Spatial | 91.45 | 90.57 | 92.33 |
| Learning Rate = 0.005 | 86.34 | 83.20 | 89.48 |
| Texture enhancement disabled | 83.60 | 83.27 | 83.93 |
| ASGD used as the optimizer | 87.56 | 88.05 | 87.07 |

It is observable that the detection accuracy without high-pass filtering achieves 91.70%, which demonstrates the filtering operation can effectively capture high-frequency components suppress the interference of the image contents, and facilitate the learning of discriminative traces. For the scenario without random horizontal/vertical flipping, the detection accuracies reach 94.58% and 94.07%. These results imply that data augmentation can enhance the size and quality of training datasets such that better deep-learning models can be built. Further, the performance decreases when the attention sub-modules are connected in other ways, and using two sub-modules at the same time outperforms using a single one. The better performance of the combination of modules in the system can be attributed to the stronger representation of inherent trace information. By leveraging channel and spatial attention sub-modules, the network is equipped with the ability to learn what and where to emphasize, which refines intermediate features and facilitates trace exploration effectively.

It is also observable that a learning rate that is too large can cause the model to converge too quickly to a suboptimal solution. The Adam optimizer may outperform the method with the ASGD optimizer to some extent. This can be attributed to the stronger ability of the Adam optimizer in accelerating the convergence towards the relevant direction and reducing the fluctuation to the irrelevant direction in this detection task. Last but not least, the results also show a performance drop with depth texture enhancement disabled. The finding infers that the submodule is helpful in improving the detection performance by providing refined and discriminative features.

In real scenarios, forgers may conduct postprocessing operations, such as adding noise and image compression, to suppress the traces of CGs and deceive the forensics programs. Therefore, it is significant to investigate the robustness and sensitivity of the detection algorithm to different postprocessing operations. In this experiment, two types of postprocessing operations (i.e., JPEG compression and adding noise) were performed on the images in the testing subsets of DSGCG. The quality factor (QF) is set to {90, 70, 50} to enable different quality levels. Considering the case of randomly setting the value of QF, where the image is compressed with an arbitrary QF, the algorithm does not only pick up on the compression trace for detection. Two forms of noise often seen on digital images, namely Gaussian white noise and salt and pepper noise, are separately added to the images. The mean of Gaussian white noise and the density of salt and pepper noise is set to 0.01 and 0.02, respectively.

Figure 10B:
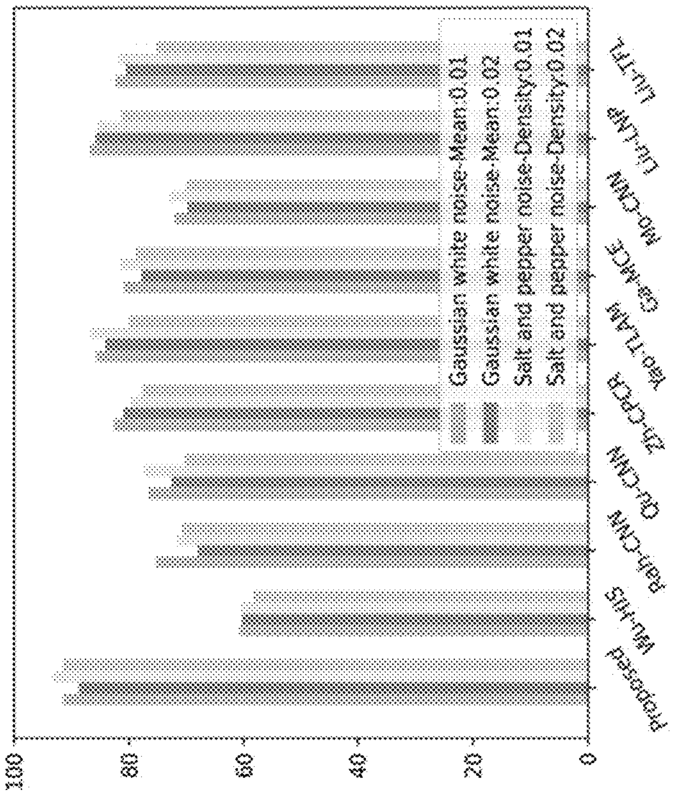
FIG. 10B is a plot showing performance evaluation with adding noise.
Figure 10A:
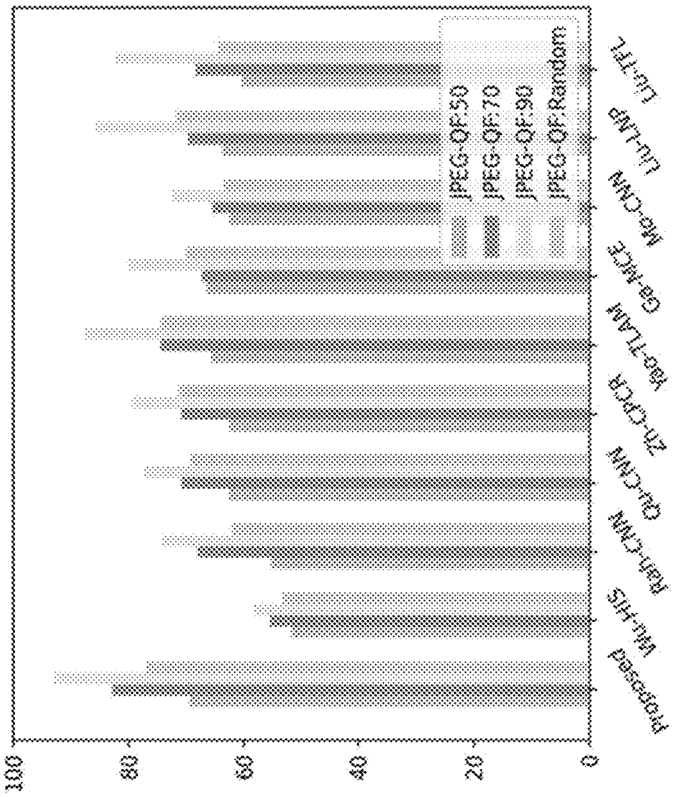
FIG. 10A is a plot showing performance evaluation with JPEG compression.

From the results in FIGS. 10A and 10B, it can be observed that although different postprocessing operations are performed, the detection accuracies of the present system are generally higher than other examples. With the value of QF decreasing, detection accuracies of all approaches drop dramatically due to the heavy compression and loss by JPEG coding. Although the approach achieves the worst results when QF=50, the present system still outperforms examples in this case, with average accuracy of 69.37%, which is 2.87% higher than the second-best approach. It can also be observed that the present system achieves higher accuracies when different noises are added, averaging 91.20% on the DSGCG dataset. With the increase of the mean of Gaussian white noise and the density of salt and pepper noise, the accuracies of all approaches decrease. It can be attributed to the fact that a higher mean or density value reinforces the interference of noise information.

It can also be observed that the results are still better than other examples when the value of QF is randomly set. It is also worth noting that the system maintains outstandingly reliable detection accuracies of over 93% in the scene where salt and pepper noise (Density=0.01) is added. The result proves that the present system learns more robust and representative features. In summary, the present system demonstrates strong robustness to different postprocessing operations.

Optionally, the negative samples and the positive samples includes, respectively, natural photographic images and computer-generated images added with image noise and/or compression traces, such that the image processing engine is trained with database that include samples with these image traces.

Considering that images from an unknown device may be used for testing in real scenarios, the performance of the present invention is evaluated in the cross-dataset scenario. In this experiment, the system was trained on the images in the DSGCG dataset and test the model on images of the DSTok and DSMan datasets, and the network is trained till 400 epochs and report on the model that gave the highest accuracy. The comparison results are summarized in the following table.

| Testing Dataset: DSTok | | | Testing Dataset: DSMan | | |
|---|---|---|---|---|---|
| ACC (%) | TPR (%) | TNR (%) | ACC (%) | TPR (%) | TNR (%) |
| 88.95 | 85.75 | 92.15 | 85.38 | 82.44 | 88.32 |

It can be observed that the present invention still achieves relatively promising performance in this scenario. The detection accuracy of the system reaches 88.95% when test on DSTok. In terms of TPR and TNR, the accuracies are 85.75% and 92.15%, respectively. This demonstrates the good generalization ability of the system thanks to the rich and refined features learned by the MDTL-NET. Good results can also be obtained when the system is tested on the DSMan dataset.

The cross-modal generalization ability is also evaluated to show the performance when facing unseen cross-modal generated images. In one experiment, the system was trained on the TCG dataset and was tested on the GAN and DM-generated test sets respectively to analyze whether the TCG-trained model can detect AIG images. In addition, GAN, DM-based images were used for training and testing to evaluate the performance when facing different AIG images. The rest of the experiment settings and procedures are the same as those as described earlier in this disclosure.

With reference to FIGS. 11A to 11D, there is a general reduction of the performance of all methods compared to in-domain detection performance. The phenomenon can be attributed to the differences between TCG, GAN, and DM generation models.

Figure 11B:
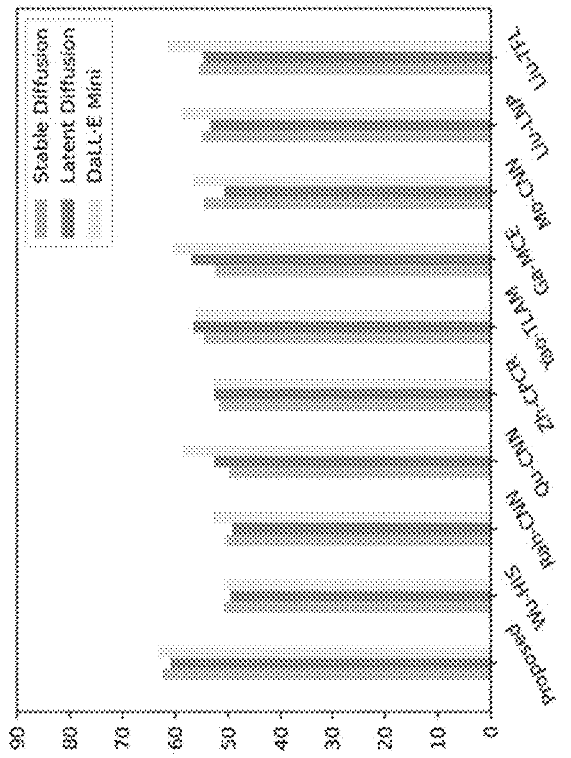
FIG. 11B is a plot showing detection accuracies on cross-modal image detection, wherein the models are trained on TCG and tested on DM.
Figure 11A:
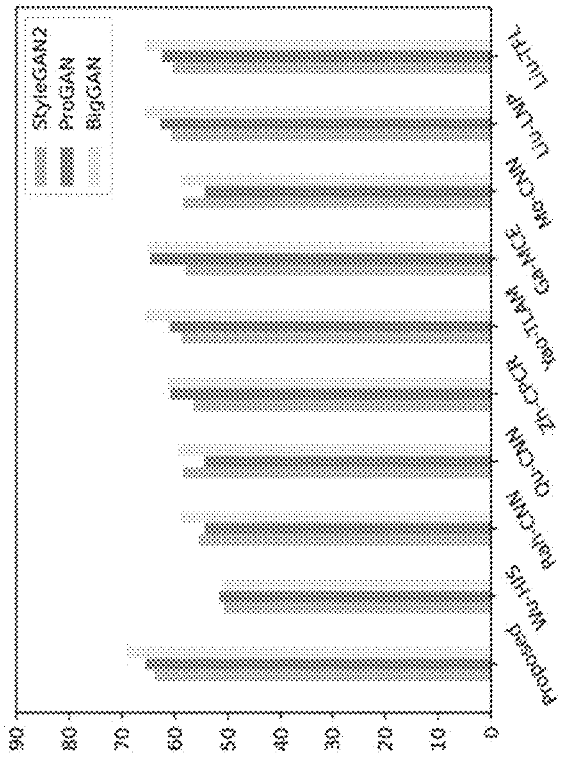
FIG. 11A is a plot showing detection accuracies on cross-modal image detection, wherein the models are trained on TCG and tested on GAN.

Referring to FIGS. 11A and 11B, the present system still achieves the best accuracies for GAN-generated image testing, achieving an average accuracy of 69.10% on BigGAN image testing, which is 18.08%, 10.23%, 9.88%, 7.80%, 3.64%, 4.09%, 10.13%, 3.38%, and 3.66% higher than other systems. Since the GAN images are generated in a different way, it is difficult for the model trained on CG images to accurately distinguish between GAN images and natural images. When the DM-generated images are used for testing, higher accuracies can also be obtained by the present system, outperforming other systems by 12.70%, 10.25%, 4.52%, 10.54%, 7.12%, 2.87%, 6.44%, 4.32%, and 1.54% for the DALL·E mini case.

Figure 11C:
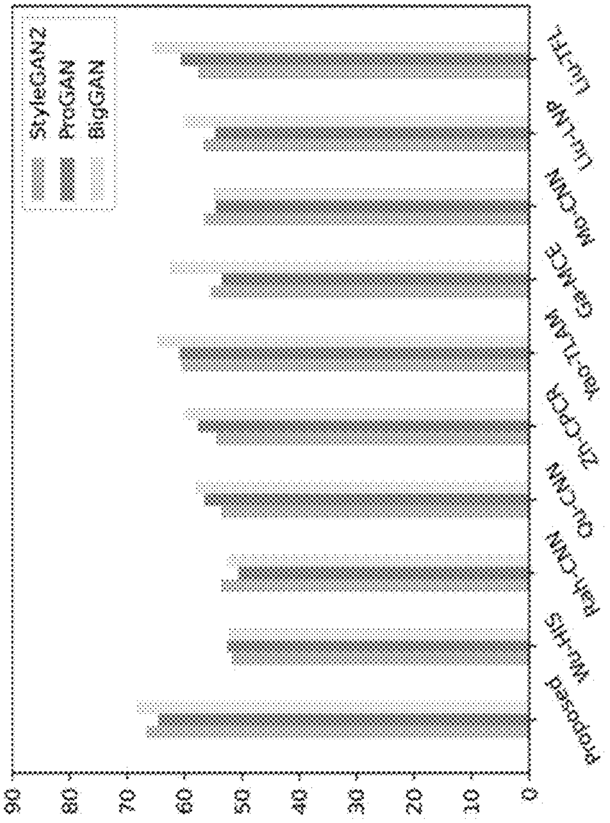
FIG. 11C is a plot showing detection accuracies on cross-modal image detection, wherein the models are trained on DM and tested on GAN.
Figure 11D:
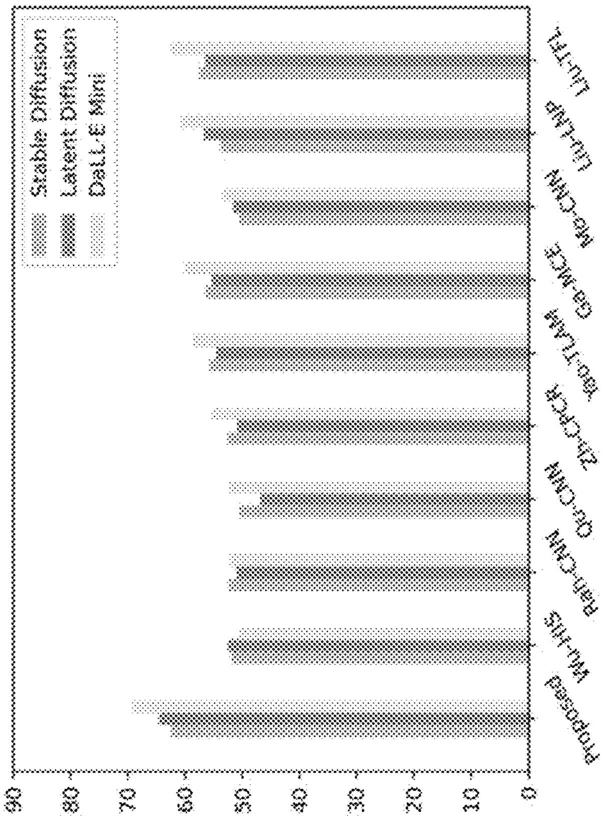
FIG. 11D is a plot showing detection accuracies on cross-modal image detection, wherein the models are trained on GAN and tested on DM.

The results of different AIG images testing using networks trained on different generative model-based images are shown in FIGS. 11C and 11D. It can also be observed that the present invention outperforms other system.

These embodiments maybe advantageous in that, a system for detecting CG and PG image based on analysis of image traces is provided. The inventors devised that, having a clear understanding of how the CG and PG images are different in the generation process may be helpful for exploring more effective methods to enhance and represent the discriminative traces caused by the acquisition modules. Different from other example methods for detecting CG images, the present invention emphasizes on:

(1) A clear analysis of different acquisition processes in CG and PG images. The inherent traces of CG and PG images caused by different generation and processing operations are analyzed, which provides a basis for the trace learning strategy, and also makes up for the lack of theoretical analysis in the current literature.

(2) An effective module for multi-scale texture representation. Preferably, a global texture representation module (GTRM) may be employed to facilitate the learning of multi-scale feature patterns.

(3) Texture difference amplification. Different from the other example strategy of hand-crafted or deep learning feature extraction, preferably, a deep texture enhancement module may be employed to amplify the discriminative traces in images based on a semantic segmentation map guided affine transformation operation and convolutional neural networks (CNN) based texture recovery.

(4) A robust multi-scale deep texture learning network (MDTL-Net) for CG image detection. A hybrid neural network may be employed for robust CG image detection. By adopting a separation-fusion detection strategy equipped with the attention mechanism, the network can effectively learn the representative information of texture perturbation, high-frequency residual, and the global spatial trace in images.

(5) Evaluation with outstanding performance on a newly constructed dataset and three existing datasets. A large-scale, highly-diverse, and realistic dataset with 42000 CG and 42000 PG images may be used to address the limitations in existing datasets. Different generative technologies such as traditional CG, GAN and DM are considered. Both intra-dataset and inter-dataset testing verify the performance. In addition, robustness to post-processing operations and generalization ability for the detection of fake image generated by different generative models has also been considered in some examples.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include tablet computers, wearable devices, smart phones, Internet of Things (IoT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for detecting computer-generated images, comprising an image processing engine arranged to analyze an input digital image embedded with image traces created during generation and/or post-generation processing operation of the input digital image, and to determine whether the input digital image is a computer-generated image or a natural photographic image based on the analysis of the image traces;

wherein the image processing engine further comprises a texture enhancement module arranged to amplify texture differences of multi-scale texture patterns;

wherein the image traces include multi-scale texture patterns of image features in the input digital image;

wherein the texture enhancement module is arranged to amplify discriminative traces associated with image features, which captures relationships and differences of the multi-scale texture patterns by a global texture representation module;

wherein the discriminative traces are amplified based on a semantic segmentation map guided affine transformation operation and convolutional neural networks-based texture recovery; and wherein the image processing engine further comprises a deep parsing network arranged to generate a segmentation map for the semantic segmentation map guided affine transformation operation.

2. The system for detecting computer-generated images of claim 1, wherein the image processing engine includes a machine-learning based processing engine.

3. The system for detecting computer-generated images of claim 2, wherein the image processing engine comprises the global texture representation module arranged to capture relationship and differences of the multi-scale texture patterns to determine whether the image features are generated by a computing process or by a photographical means.

4. The system for detecting computer-generated images of claim 3, wherein the global texture representation module incorporates ResNet architecture.

5. The system for detecting computer-generated images of claim 4, wherein the global texture representation module comprises at least one convolution layer, a Gram matrix-based activation layer and a global pooling layer.

6. The system for detecting computer-generated images of claim 1, wherein the texture enhancement module comprises at least one convolution layer, semantic segmentation map-guided residual blocks, an affine transformation module and an upsampling module.

7. The system for detecting computer-generated images of claim 1, wherein the deep parsing network is further arranged to generate intermediate spatial feature transformation maps and feature maps associated with the image features for further process by the affine transformation module.

8. The system for detecting computer-generated images of claim 1, wherein the image processing engine further comprises an attention-based feature perception module arranged to facilitate trace exploration in spatial and channel dimensions.

9. The system for detecting computer-generated images of claim 8, wherein the attention-based feature perception module comprises a convolution layer, an average-pooling layer and a channel-spatial attention module.

10. The system for detecting computer-generated images of claim 9, wherein the channel-spatial attention module comprises a channel attention submodule connected to a spatial attention submodule in a sequential order.

11. The system for detecting computer-generated images of claim 9, wherein the image processing engine further comprises a fully connected layer and a softmax layer arranged to determine an output probability of whether the input digital image is a computer-generated image or a natural photographic image based on concatenated high-level features obtained by the global texture representation module, the texture enhancement module and the attention-based feature perception module.

12. The system for detecting computer-generated images of claim 1, wherein the image traces include texture perturbation, high-frequency residual or global spatial trace in the input digital image.

13. The system for detecting computer-generated images of claim 1, wherein the computer-generated image is generated by geometric data modeling, photorealistic rendering or is generated based on an artificial intelligence generative model.

14. The system for detecting computer-generated images of claim 13, wherein the image processing engine is trained by providing both a plurality of computer-generated images and a plurality of natural photographic image as positive samples and negative samples so as to train the image processing engine in a machine learning process, wherein the natural photographic images are generated by a digital camera.

15. The system for detecting computer-generated images of claim 14, wherein the negative samples and the positive samples includes, respectively, natural photographic images and computer-generated images added with image noise and/or compression traces.

* * * * *